(12) United States Patent
Kempshall

(10) Patent No.: US 11,305,863 B1
(45) Date of Patent: *Apr. 19, 2022

(54) HYBRID LIGHTER-THAN-AIR VEHICLE

(71) Applicant: Hyalta Aeronautics, Inc., St. Petersburg, FL (US)

(72) Inventor: Scott R. Kempshall, St. Petersburg, FL (US)

(73) Assignee: Hyalta Aeronautics, Inc., St. Petersburg, FL (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/722,203

(22) Filed: Dec. 20, 2019

Related U.S. Application Data

(63) Continuation of application No. 15/184,441, filed on Jun. 16, 2016, now Pat. No. 10,532,803, which is a continuation-in-part of application No. PCT/US2015/041490, filed on Jul. 22, 2015, which is a continuation of application No. 14/746,332, filed on Jun. 22, 2015, now Pat. No. 10,287,000, which is a continuation-in-part of application No. 14/515,079, filed on Oct. 15, 2014, now Pat. No. 10,377,465, which is a continuation-in-part of application No.
(Continued)

(51) Int. Cl.
| | |
|---|---|
| *B64C 3/38* | (2006.01) |
| *B64B 1/00* | (2006.01) |
| *B64D 27/02* | (2006.01) |
| *B64B 1/12* | (2006.01) |
| *B64C 3/46* | (2006.01) |

(52) U.S. Cl.
CPC .................. *B64C 3/38* (2013.01); *B64B 1/00* (2013.01); *B64B 1/12* (2013.01); *B64C 3/46* (2013.01); *B64D 27/02* (2013.01); *B64B 2201/00* (2013.01); *B64D 2211/00* (2013.01)

(58) Field of Classification Search
CPC .................................................. B64B 2201/00
See application file for complete search history.

(56) References Cited

U.S. PATENT DOCUMENTS

| | | |
|---|---|---|
| 3,907,218 A | 9/1975 | Miller |
| 3,913,871 A | 10/1975 | Miller |
| 3,970,270 A | 7/1976 | Pittet, Jr. |
(Continued)

FOREIGN PATENT DOCUMENTS

CN 107284640 A * 10/2017

OTHER PUBLICATIONS

International Search Report for PCT Application No. PCT/US15/41490, International filing date Jul. 22, 2015, and dated Oct. 16, 2015.

*Primary Examiner* — Joseph W Sanderson
(74) *Attorney, Agent, or Firm* — Nicholas Pfeifer; Smith & Hopen, P. A.

(57) ABSTRACT

The present invention is a variable geometry aircraft that is capable of morphing its shape from a symmetric cross-section buoyant craft to an asymmetric lifting body and even to a symmetric zero lift configuration. The aircraft may include variable span, length, and camber. The variability of the structure and the flexible envelope allows the aircraft to adjust its aspect ratio along with the camber of the upper and/or lower surfaces to achieve varying shapes. This transformation changes both the lift and drag characteristics of the craft and may be accomplished while the craft is airborne.

20 Claims, 37 Drawing Sheets

Related U.S. Application Data

14/341,184, filed on Jul. 25, 2014, now Pat. No. 9,623,954.

(56) References Cited

U.S. PATENT DOCUMENTS

| | | | |
|---|---|---|---|
| 3,976,265 A | 8/1976 | Doolittle | |
| 3,993,268 A | 11/1976 | Moore | |
| 4,052,025 A | 10/1977 | Clark et al. | |
| 4,085,912 A | 4/1978 | Slater | |
| 4,102,519 A | 7/1978 | Crosby, Jr. | |
| 4,149,688 A * | 4/1979 | Miller, Jr. | B64C 29/0033 244/12.4 |
| 4,261,534 A | 4/1981 | Roselli | |
| 4,366,936 A | 1/1983 | Ferguson | |
| 4,415,131 A | 11/1983 | Bertelsen et al. | |
| 4,482,110 A | 11/1984 | Crimmins, Jr. | |
| 4,497,272 A | 2/1985 | Veazey | |
| 4,695,012 A | 9/1987 | Lindenbaum | |
| 4,779,825 A | 10/1988 | Sams | |
| 5,005,783 A | 4/1991 | Taylor | |
| 5,474,257 A | 12/1995 | Fisher et al. | |
| 6,241,195 B1 | 6/2001 | Wagner, III | |
| 6,910,661 B2 | 6/2005 | Dockter et al. | |
| 7,261,255 B2 * | 8/2007 | Li | B64B 1/04 244/125 |
| 7,866,601 B2 * | 1/2011 | Balaskovic | B64B 1/10 244/96 |
| 9,623,954 B2 * | 4/2017 | Kempshall | F03D 9/32 |
| 9,694,894 B2 * | 7/2017 | Deakin | B64B 1/12 |
| 10,287,000 B2 * | 5/2019 | Kempshall | B64D 27/02 |
| 10,377,465 B2 * | 8/2019 | Kempshall | B64B 1/26 |
| 10,532,803 B2 * | 1/2020 | Kempshall | B64B 1/00 |
| 2010/0276546 A1 * | 11/2010 | Im | B64B 1/58 244/171.1 |
| 2011/0267241 A1 | 11/2011 | Grimm et al. | |
| 2014/0339356 A1 * | 11/2014 | Deakin | B64B 1/02 244/25 |

\* cited by examiner

FIG. 37

FoilSim Output for Symmetric Foil with High Thickness as a Percentage of Chord

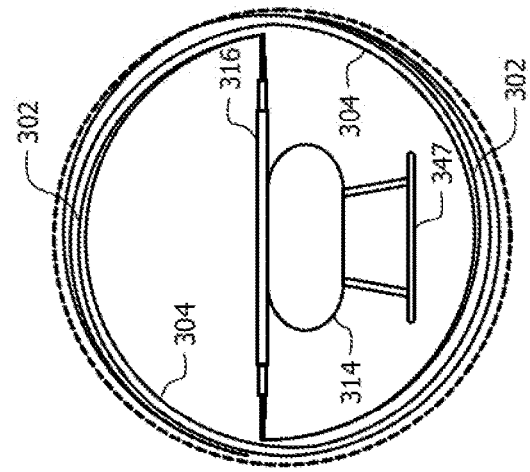
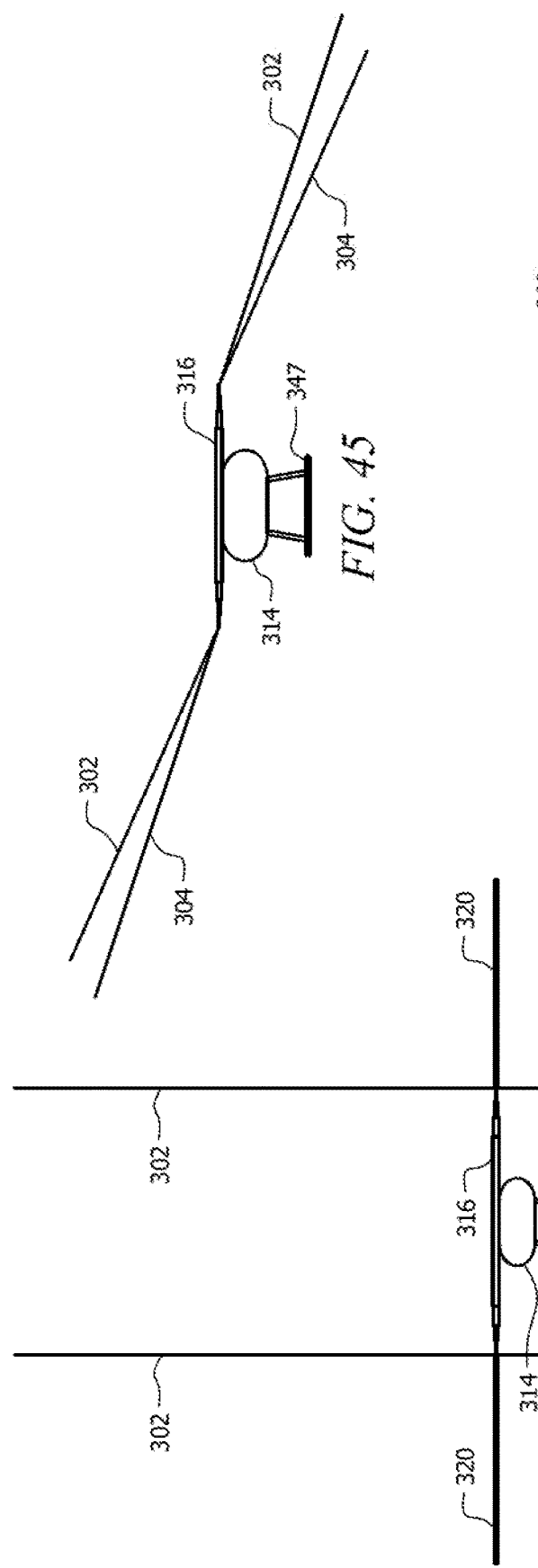

HYBRID LIGHTER-THAN-AIR VEHICLE

CROSS-REFERENCE TO RELATED APPLICATIONS

This nonprovisional application is a continuation of and claims priority to nonprovisional application Ser. No. 15/184,441, entitled "HYBRID LIGHTER-THAN-AIR VEHICLE," filed Jun. 16, 2016 by the same inventor, which is a continuation in part of and claims priority to PCT application No. PCT/US15/41490, entitled "HYBRID LIGHTER-THAN-AIR VEHICLE," filed Jul. 22, 2015 by the same inventor, which is a continuation of and claims priority to nonprovisional application Ser. No. 14/746,332, entitled "HYBRID LIGHTER-THAN-AIR VEHICLE," filed Jun. 22, 2015 by the same inventor, issued on May 14, 2019 as U.S. Pat. No. 10,287,000, which is a continuation in part of and claims priority to nonprovisional application Ser. No. 14/515,079, entitled "HYBRID LIGHTER-THAN-AIR VEHICLE," filed Oct. 15, 2014 by the same inventor, issued on Aug. 13, 2019 as U.S. Pat. No. 10,377,465, which is a continuation in part of and claims priority to nonprovisional application Ser. No. 14/341,184, entitled "HYBRID LIGHTER-THAN-AIR VEHICLE," filed Jul. 25, 2014 by the same inventor, issued on Apr. 18, 2017 as U.S. Pat. No. 9,623,954.

BACKGROUND OF THE INVENTION

1. Field of the Invention

This invention relates, generally, to aircrafts. More specifically, it relates to aircrafts convertible between lighter-than-air and heavier-than-air configurations.

2. Brief Description of the Prior Art

Lighter-Than-Air (LTA) aircrafts have some characteristics not shared with Heavier-Than-Air (HTA) aircrafts in that they can maintain altitude without moving in a medium and can do so as long as buoyancy is maintained. LTA aircrafts use low-density gas, such as helium or hydrogen to float in higher density air. These aircrafts usually employ one or more gasbags filled with low-density gas to create a buoyancy force that offsets the weight of the aircraft. The downside of LTA aircrafts is their large size, which is accompanied by large drag characteristics, preventing them from traveling at higher speeds. The current speed record for an LTA aircraft is 112 Km/hr (69.6 mph) but 56 Km/hr is a common cruise speed.

HTA aircrafts use Newton's third law and Bernoulli's principle to achieve flight. These aircrafts are generally fixed wing or rotor wing aircraft. In either case, part or parts of the structure (e.g., wing, rotors, propellers, fuselage, and control surfaces) have a characteristic shape called an airfoil. Airfoils are generally asymmetric in cross-section with the upper surface having a greater length than the lower surface. This causes air moving across the upper surface to travel faster than the air traveling across the lower surface causing a pressure decrease on the upper surface resulting in lift.

Lift can also be achieved/altered by altering the angle of attack (AoA) of an airfoil relative to the oncoming airflow. Increased AoA causes mass deflection resulting in lift (Newton's third law). Generally, increasing AoA increases lift until the angle reaches a point at which the airflow separates from the surface of the airfoil causing aerodynamic stall.

Regardless of means for creating lift, an HTA requires a wing-like structure moving through a fluid. Movement requires a power source and no power source can last indefinitely. Therefore, the HTA aircrafts can only maintain flight for limited periods of time. Even powerless gliders have duration limits as they trade airspeed for altitude gained from thermal lift. The limitation in flight time of an HTA aircraft, however, is compensated by low drag characteristics and thus, high-speed flight.

The clear tradeoff between LTA and HTA aircrafts is speed verse indefinite flight. An ideal aircraft would have the ability of an LTA to hover, or station-keep, for extended periods for observation or surveillance roles and also the ability of an HTA to operate at high-speeds. This can theoretically be achieved through an aircraft convertible between an LTA and an HTA configuration. Currently, there exist hybrid convertible aircrafts, but none that provide a unique combination of attributes of both a fixed wing aircraft and an LTA craft allowing for indefinite mission durations, low energy station keeping, and the ability to dash at relatively high velocities.

U.S. Pat. No. 5,005,783 to James D. Taylor teaches a variable geometry airship capable of converting between an LTA and HTA airship. However, the airship is operationally complex and does not extend the operating range sufficiently to be practical as shown in Table 1. Along with multiple other pitfalls, the shape and design of this airship prevents the airship from transforming into both a symmetric neutral lift configuration and a negative lift configuration, thereby reducing the effectiveness of the airship.

U.S. Pat. No. 4,102,519 to Edward L. Crosby, Jr. teaches a variable lift inflatable airfoil. However, this invention lacks internal moveable structures, which prevent the airfoil from achieving multiple configurations. Additionally, the airfoil lacks a propulsion system and/or control surfaces.

Accordingly, what is needed is an improved variable geometry aircraft having a simple, moveable internal structure to easily convert the aircraft between an LTA configuration and an HTA configuration.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved variable geometry aircraft having a simple, moveable internal structure to easily convert the aircraft between a lighter-than-air configuration and a heavier-than-air configuration is now met by the present invention.

The present invention includes a convertible design having a lighter-than-air configuration and a heavier-than-air configuration with a flexible envelope in communication with a base structure. The present invention further includes adjustable longerons and length adjusting slack managers for varying the shape of the aircraft. The lighter-than-air configuration typically has a span that is less than the span of the aircraft when in the heavier-than-air configuration. Further the aircraft may include a gas delivery for filing the envelope with lighter-than-air gas when the aircraft is in the lighter-than-air configuration allowing for multiple translation cycles.

The base structure includes a central core, a port side outrigger, and a starboard side outrigger. In an embodiment, the core has an adjustable chord length directionally generally parallel with the longitudinal axis of the aircraft, such that the core is capable of adjusting at least some portion of the chord length of the flexible envelope. In an embodiment, the port side outrigger and the starboard side outrigger each have an adjustable chord length, such that at least some portion of the chord length of the flexible envelope adjusts as each outrigger's chord length adjusts. The lighter-than-air configuration is achieved in any geometry in which the volume of buoyant gas is sufficient to offset the weight of the aircraft and payload.

In addition to the central core, the base structure includes a leading and trailing edge strut with both extending in a direction generally perpendicular to and in communication with the central core. The outriggers extend in a direction typically parallel to the central core and is in communication with the struts. Additionally, the base structure is in communication with the moveable longerons and the slack managers. The central core may house a propulsion system to provide a powered aircraft or may house the mechanisms and/or lighter-than-air gas container(s), which would be more ideal for a glider embodiment.

The moveable longerons include upper and lower longerons. The upper longerons are in communication with the flexible envelope and an upper translation assembly. In an embodiment, the upper translation assembly has an extended configuration where the moveable longerons are in a high camber orientation and a retracted configuration where the upper moveable longerons are in a low camber orientation. In transitioning to the retracted configuration, the upper translation assembly moves the upper moveable longerons inward towards the lateral plane of the aircraft to decrease aircraft thickness. In transitioning to the extended configuration, the upper translation assembly moves the moveable longerons outward away from the lateral plane of the aircraft to place the upper moveable longerons in a more vertical orientation, which increases the aircraft thickness, compared to the orientation of the longerons in the retracted configuration.

Similarly, the lower longerons are in communication with the flexible envelope and a lower translation assembly. The lower translation assembly has an extended configuration where the moveable longerons are in a high camber orientation and a retracted configuration where the lower moveable longerons are in a low camber orientation. In transitioning to the retracted configuration, the lower translation assembly moves the lower moveable longerons inward towards a lateral plane of the aircraft to decrease aircraft thickness. In transitioning to the extended configuration, the lower translation assembly moves the moveable longerons outward away from the lateral plane of the aircraft to place the lower moveable longerons in a more vertical orientation, which increases the aircraft's thickness, compared to the orientation of the longerons in the retracted configuration. An embodiment may include an upper translation assembly without a lower translation assembly or a lower translation assembly without an upper translation assembly.

Multiple longeron translation mechanisms are envisioned for this aircraft depending on aircraft size and mission. In an embodiment, each translation assembly includes a translation motor fixed to the base structure of the aircraft and a translation strap in communication with the translation motor. The translation strap is a continuous loop fixed at one of the longerons and passes near an outrigger on the same side of the aircraft. When operated the motor causes the translation strap to rotate, which in turn pulls the longeron towards or away from a central longitudinal axis of the aircraft.

The upper and lower moveable longerons each include a port side longeron and a starboard side longeron, wherein each longeron has a generally airfoil or arc shape and a predetermined length that extends in generally the same direction as the central longitudinal axis of the aircraft. Moreover, the moveable longerons are in a generally vertical orientation when in the high camber position and in an acute angle orientation when in the low camber position.

The length-adjusting slack managers comprise of a port side slack manager and a starboard side slack manager. Each arm has a generally arc shape, is subjected to a bias force attempting to force each arm in a direction away from the central longitudinal axis of the aircraft resulting in an increased arc shape, and is in communication with the flexible envelope. Additionally, each slack manager has a retracted position and an expanded position, where in the retracted position, the length and arc of the slack manager is at a minimum and in the expanded position, the length and arc of the slack manager is at a maximum. The retracted position is achieved when a tension force in the flexible envelope overcomes the bias force, resulting from the transition of the moveable longerons towards a more vertical orientation, thereby reducing the length and arc of the slack manager. Contrastingly, the expanded position is achieved when the tension force in the flexible envelope is overcome by the bias force, resulting from the transition of the moveable longerons to a more horizontal orientation, thereby increasing the length and arc of the slack manager. Due to the positioning of the slack managers, the span of the aircraft is directly affected by the transition between the retracted position and the extended position.

In an embodiment, the slack manager is an anisotropic beam having two or more composite rods with cross members extending between the rods. The cross members are designed to have a predetermined spring constant embedded into the structure. One of the composite rods is pivotally attached to the aircraft and one or more of the composite rods are anchored against the pivot structure to provide a source of the tension.

The present invention further includes a structural connection point to connect the base structure with the moveable longerons and the slack managers. The structural connection point has a first fixed connection attached to an outrigger, a second fixed connection attached to a strut, a first pivoting connection attached to one of the upper moveable longeron, a second pivoting connection attached to one of the lower moveable longeron, and a third pivoting connection attached to one of the slack managers.

In an embodiment, the aircraft uses a gas storage and retrieval system adapted to house, distribute, and retrieve lighter-than-air gas. This system allows the aircraft to easily convert between a lighter-than-air configuration and a heavier-than-air configuration multiple times without having to refill on gas.

Multiple internal payload carrying methods are envisioned for the aircraft. In an embodiment, the aircraft includes a propulsion system that includes an electrical generator system adapted to convert wind energy into electrical energy while the aircraft is in the lighter-than-air configuration. In an embodiment, flexible solar panels are attached to an exterior surface of the envelope to retrieve and convert solar energy into electrical energy to extend mission time.

In an embodiment, the aircraft has a payload hard point attached to the lower translation assembly to facilitate the attachment and management of external payloads in addition to payloads attached internally to the core structure. In an embodiment, the aircraft includes additional structural features, referred to as a wing load management system, to improve the wing loading capabilities that might be necessary when transporting heavy payloads. The wing load management system may include strap spars and support ribs for load distribution. A certain embodiment includes a payload hard point attached to the core of the aircraft and the envelope attached to the sides of the payload hard point such that some portion of the payload hard point is external to the envelope.

An embodiment may include at least some portion of the flexible envelope having an accordion-like structure. In an embodiment, the leading and/or trailing edge strut may be out of plane with the chord line.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF DRAWINGS

For a fuller understanding of the invention, reference should be made to the following detailed description, taken in connection with the accompanying drawings, in which:

FIG. 37 is a captured output for a symmetric airfoil with high thickness as a percentage of chord that was achieved using FoilSim software.

FIG. 38 is a captured output for a symmetric airfoil with low thickness as a percentage of chord that was achieved using FoilSim software.

FIG. 39 is a captured output for an asymmetric airfoil with low thickness as a percentage of chord that was achieved using FoilSim software.

FIG. 44 is a front view of the embodiment in FIG. 39 with the telescoping leading and trailing edge struts telescoped inward to shorten the length of each strut in preparation for storage. The envelope and translation assemblies are removed from the figure for clarity.

FIG. 45 is a front view of the embodiment from FIGS. 39 and 40 with the envelope extension arms collapsed, the distal ends of the starboard side longerons brought together, and the distal ends of the port side longerons brought together to allow the longerons to be easily wrapped around the core of the aircraft. The envelope and translation assemblies are removed from the figure for clarity.

FIG. 46 is a front view of the longerons wrapped around the core to allow for easy storage and transportation of the aircraft. The envelope and translation assemblies are removed from the figure for clarity.

DETAILED DESCRIPTION OF THE INVENTION

Figure 1:
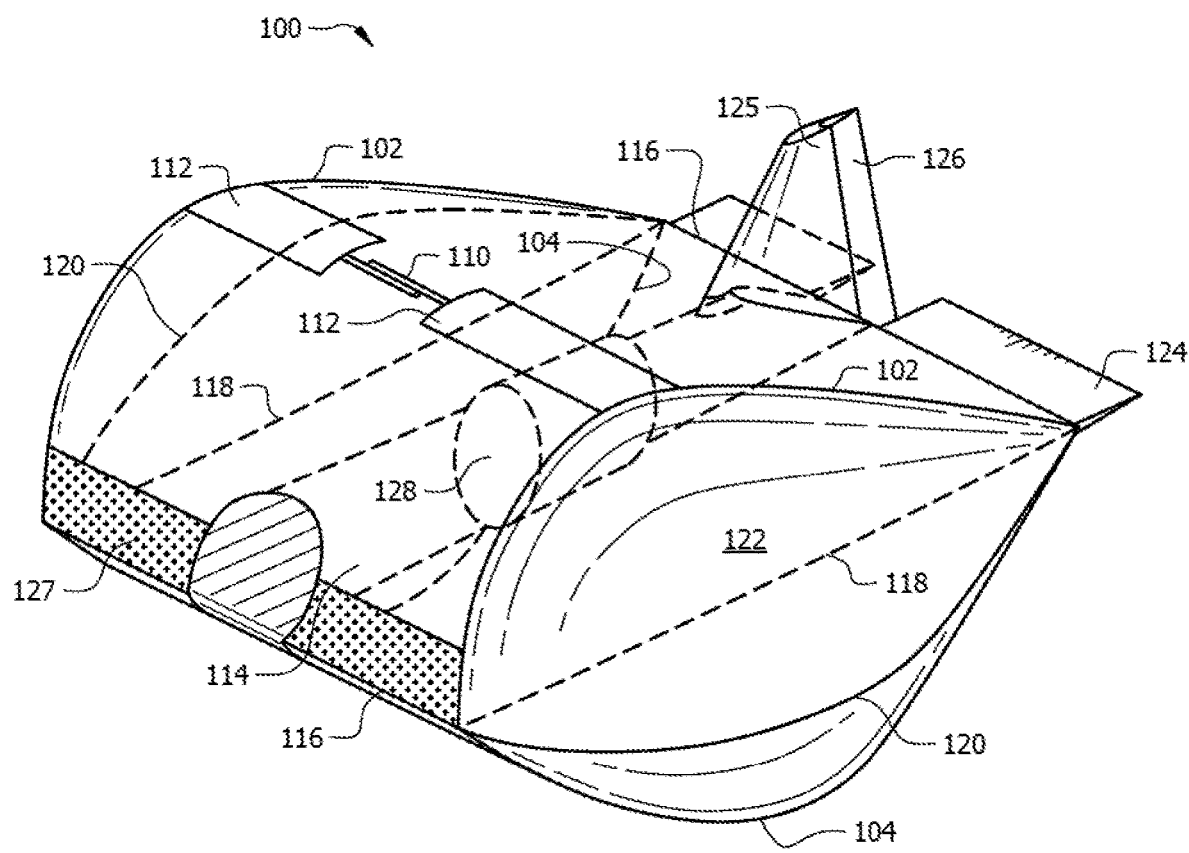
FIG. 1 is a perspective view of an embodiment of the present invention in an LTA configuration.
Figure 2:
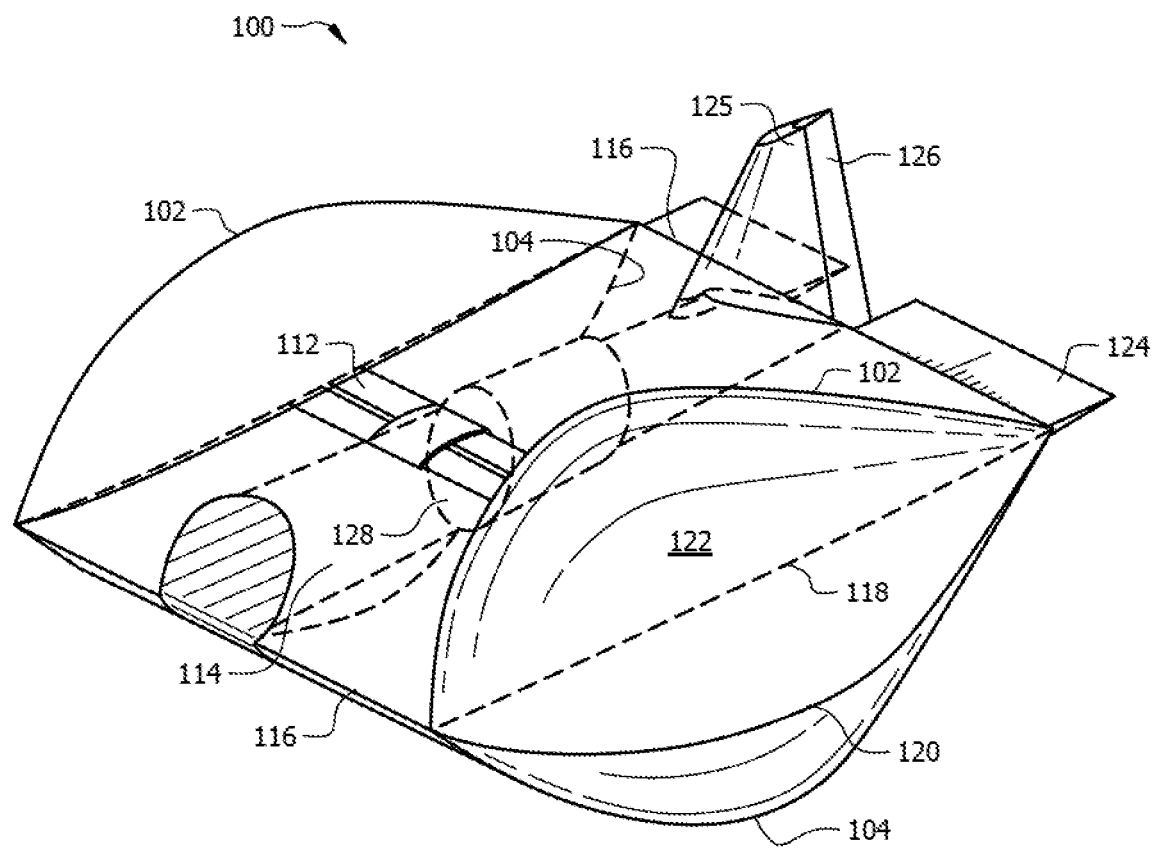
FIG. 2 is a perspective view of an embodiment of the present invention in a negative lift configuration.
Figure 3:
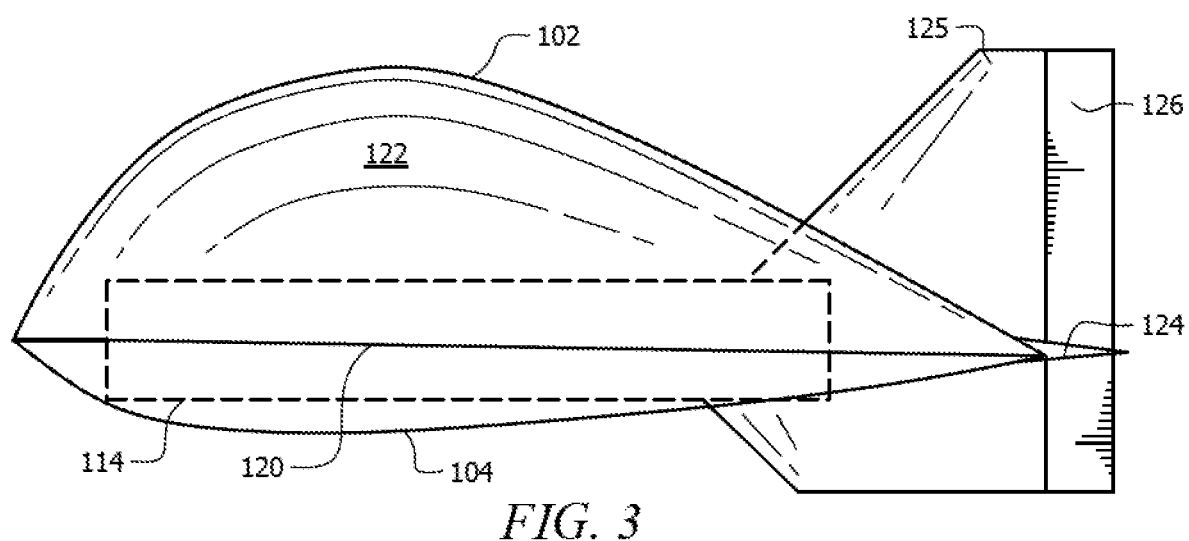
FIG. 3 is a side view of an embodiment of the present invention shown in a positive lift configuration.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Envelope: is a lightweight flexible material.

Chord Line: is a straight line extending between the leading edge and trailing edge of the envelope.

Heavier-Than-Air Configuration: is a configuration of the aircraft that cannot maintain altitude without moving through a medium to create Bernoulli lift or changing the angle of attack.

Lighter-Than-Air Configuration: is a configuration of the aircraft that has a buoyancy to weight ratio greater than 1:1.

Longeron: is a structural member of the aircraft.

Outrigger: is a structural member designed to resist compression that extends in generally the same direction as the longitudinal axis of the aircraft.

Payload Hard Point: is an attachment point for payloads or instruments carried on or within the aircraft.

Propulsion System: is a system capable of moving the aircraft through a medium.

Strut: is a rod or bar forming part of a framework and designed to resist compression.

As best illustrated in FIGS. 1-5, the present invention is a variable geometry aircraft capable of morphing its shape from a buoyant craft having a generally symmetric cross-section (FIG. 4) to an asymmetric lifting body configuration (FIGS. 1-3) or to a low camber symmetric shape (FIG. 5). Additionally, the aircraft is capable of achieving any shape between the buoyant symmetric cross-section and the low camber symmetric shape. The camber-transformation can be accomplished while the craft is airborne and does not require any ground support equipment.

The aircraft may include one or more gas containers coupled to a gas delivery and preferably retrieval system. The gas delivery system fills the internal volume of the flexible envelope with lighter than air gas, while the retrieval system is adapted to recover any gas already contained in the internal volume of the flexible envelope. These two systems allow for easy transformation between the LTA and HTA configurations. In an embodiment, the aircraft may include a valve system for venting gas out of the aircraft and into the atmosphere.

When the aircraft is in the LTA configuration, the aircraft has all of the traditional characteristics of a blimp for station keeping, vertical take-off/landing or slow speed flight. By adjusting the shape of the surface to achieve an airfoil shape, the craft can augment the buoyancy by creating aerodynamic lift to increase its duration of flight or act as a conventional unpowered glider. Moreover, by reshaping both the upper and lower surfaces, the craft can achieve a relatively low drag configuration (hereinafter the "dash" configuration) for high velocity flight (in excess of 200 km/hr for smaller aircraft sizes) to rapidly reposition itself or fly high velocity missions.

The aircraft is also highly portable, light weight, relatively silent in operation, inexpensive to produce and operate, and has a unique structure that allows it to operate even if the gas envelope is penetrated. Although there are numerous other aircraft technologies, this device can operate across a number of operating envelopes and performs multiple roles very well without significant compromise (see Table 1 below).

TABLE 1

Aircraft Comparison

| Aircraft | Velocity Range (kts) | Operating Cost | Complexity | Operational Duration |
|---|---|---|---|---|
| Rotor/VTOL | 0-115 (217*) | High | High | Low |
| Fixed Wing | 50+ | Low-High | Low-Med | Low |
| LTA | 0-30 (60*) | Low | Low-Med | High |
| Hybrid LTA** | 0-40 | High | High | Med |
| Present Invention | 0-200 | Low | Low | High |

*World Record
**Only viable recorded device defined in Pat. 5,005,783

As illustrated above, the present invention fills a unique performance niche in that, with low complexity and high reliability, a unique and broad range of performance feats can be achieved. The unique design features of the present design, taken in combination, make it an improvement on the technology for LTA aircraft, hybrid LTA aircraft, and fixed wing flying bodies, especially as applied to unmanned vehicles.

The aircraft's nearly infinite variability stems from, among other things, the interrelation of moveable longerons, slack managers, and a flexible envelope. The base structure, moveable longerons, and slack managers are all enclosed in a flexible yet durable envelope. Longerons 102 and 104 extend outward a variable distance from a lateral plane of the aircraft to adjust the camber/thickness of the upper and/or lower surfaces. Slack managers 120 extend outwardly in an arch shape from the base structure on the port and starboard sides in a generally planar direction (lateral plane) with respect to the base structure and comprised of at least two telescoping sections. Slack managers 120 are subject to a biasing force, which forces slack managers 120 to extend in length creating a larger arch shape. As a result, slack managers 120 are able to keep envelope 122 taught as longerons 102 and 104 adjust the thickness of the aircraft.

Aircraft Performance

Due to the variable geometry capabilities, the aircraft will have a range of performance characteristics spanning from a high Coefficient of Drag ($C_D$) seen in the LTA configuration to a relatively low $C_D$ seen in the flying wing configuration. The lift characteristics will also vary from a lift neutral symmetric configuration to a positive lift or negative lift airfoil shape to suit mission requirements. These configurations can be changed dynamically while airborne to suit mission needs. The driving requirement for the aircraft is the desired dash speed of approximately 200 kts for small aircraft sizes. The assessment of performance and structural characteristics has been completed for three different configurations of craft defined by the length/chord of the aircraft and the span of the central, airfoil shaped portion of the craft, defined by the outriggers and struts. The alternative driving characteristic is to support large payloads, but this requirement does not drive motor size.

Dash Speed Calculation

Figure 5A:
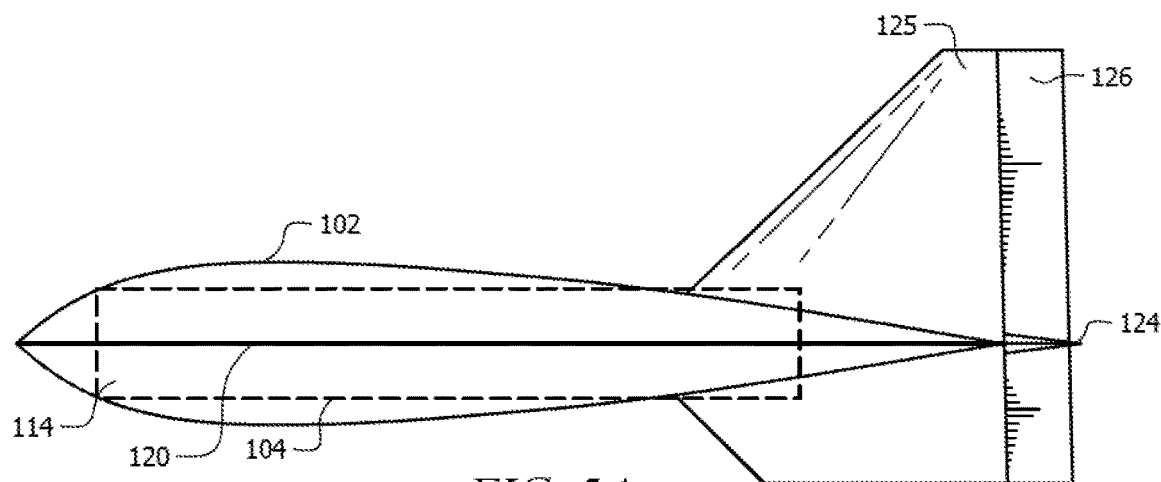
FIG. 5A is a side view of the present invention in the dash configuration.
Figure 5B:
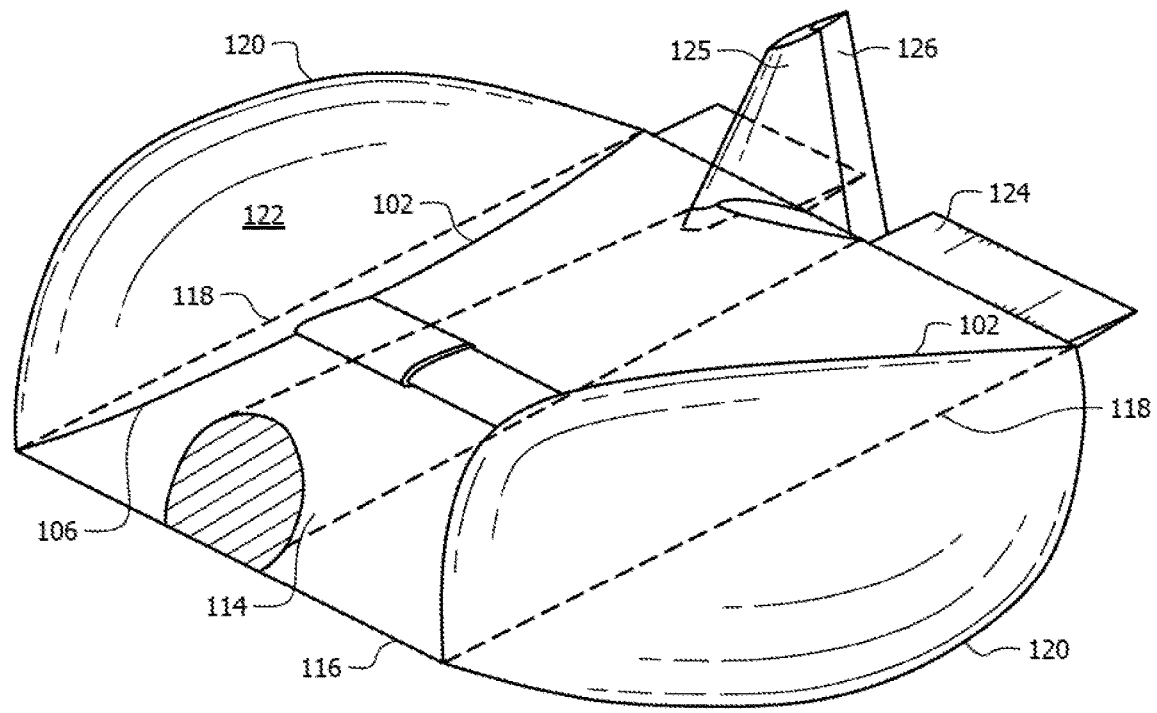
FIG. 5B is a perspective view of the present invention in the dash configuration.

The truly innovative and functionally distinct orientation found in no other LTA to HTA convertible aircraft, is the dash configuration. As shown in FIGS. 5a and 5b, the dash configuration is an approximately symmetric HTA configuration achieved when both upper translation assembly 106 and lower translation assembly 107 are in the retracted position. In this position, the upper and lower moveable longerons 106, 107 are pulled inwardly towards core 114 where they reside in a more horizontal orientation to substantially reduce the thickness and camber of the aircraft.

Figure 37:
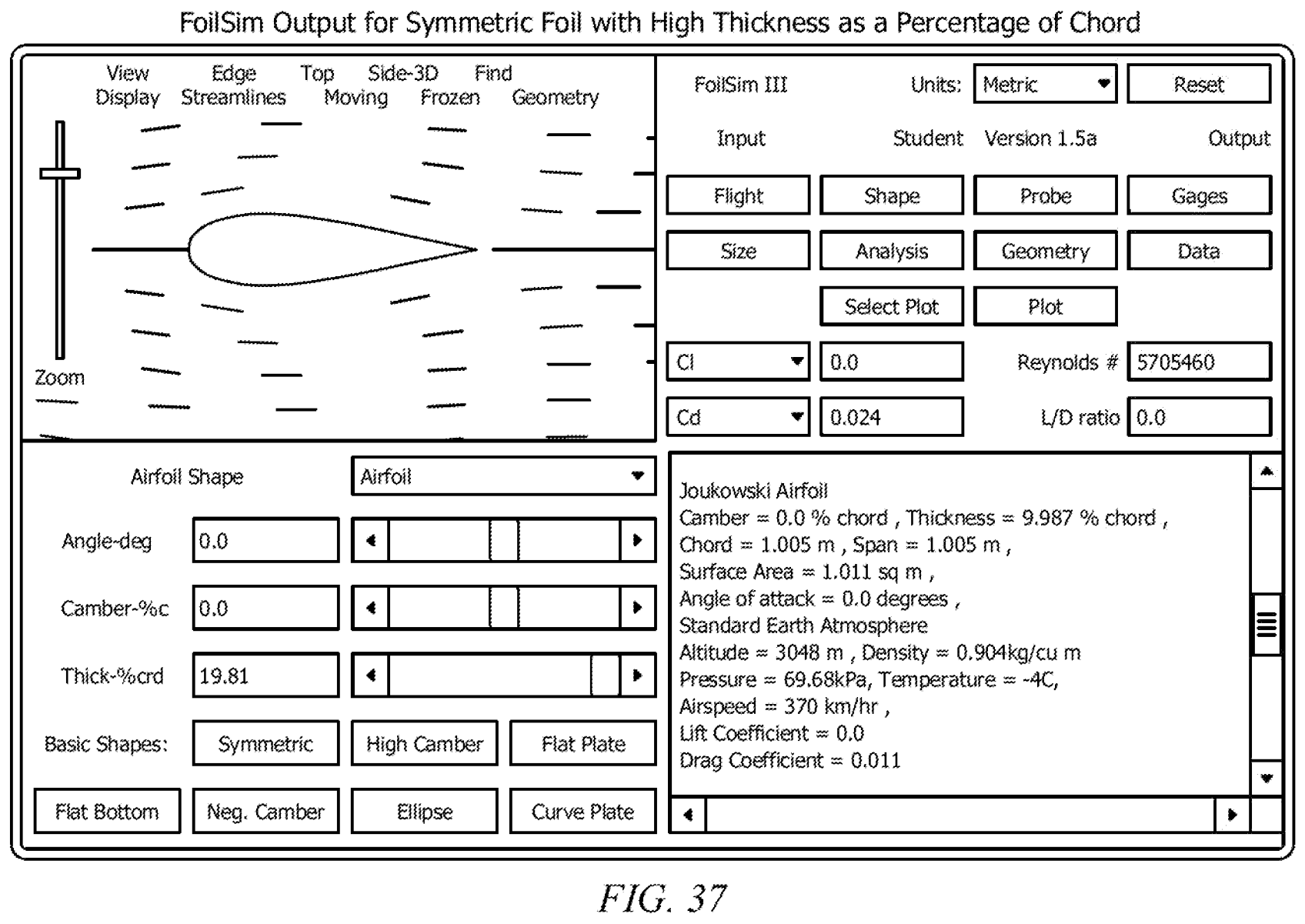
Figure 38:
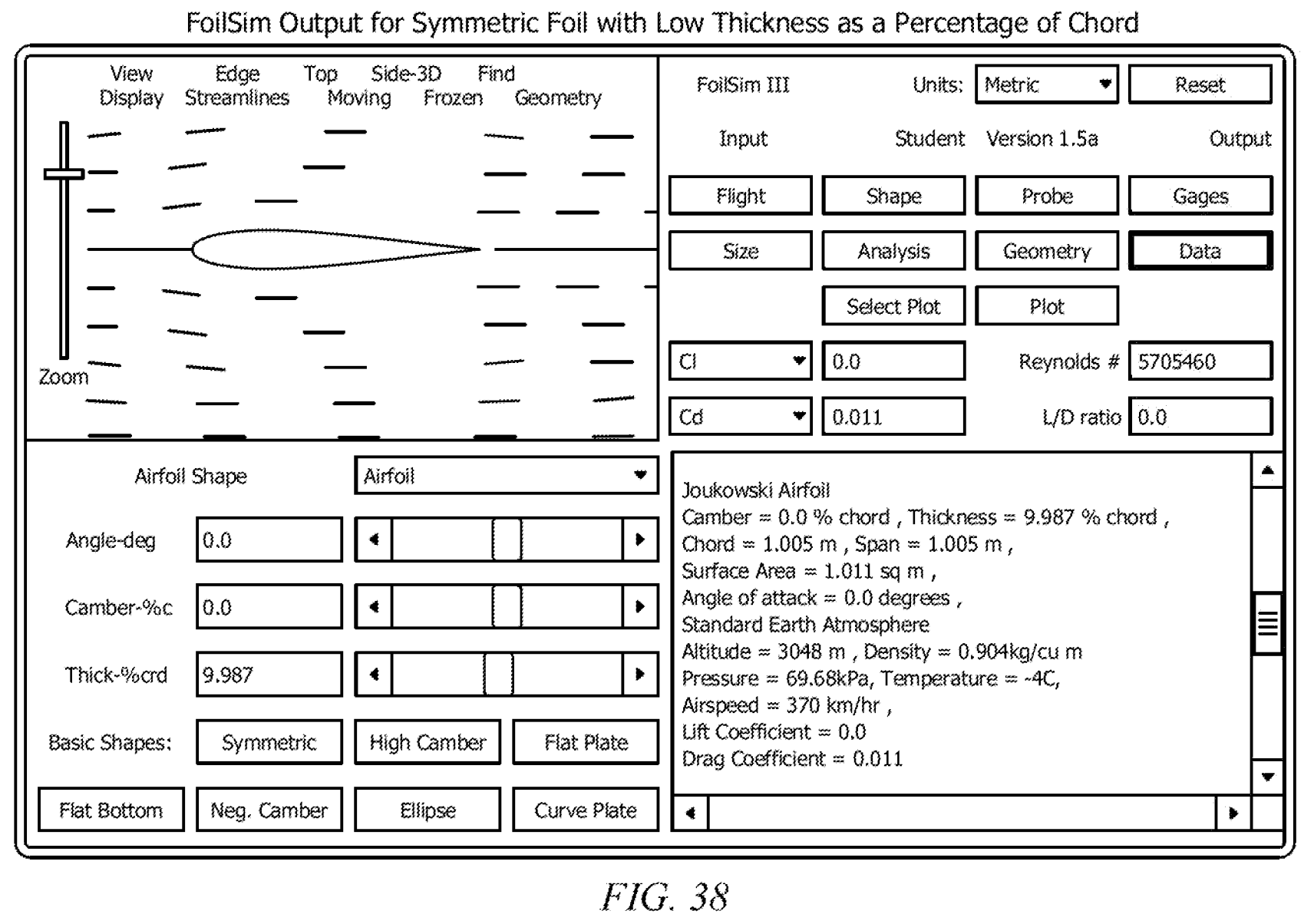
Figure 39:
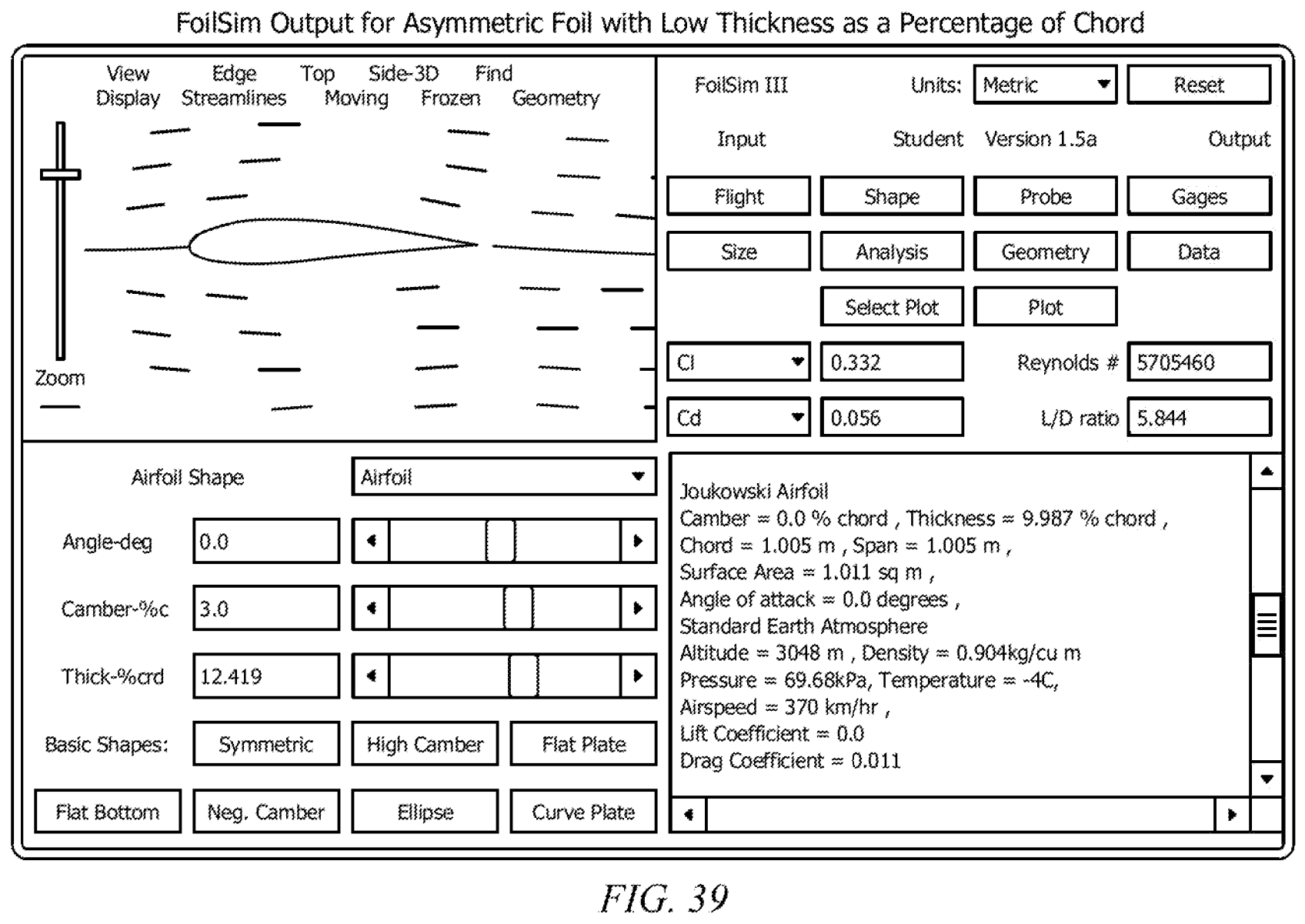
Figure 51:
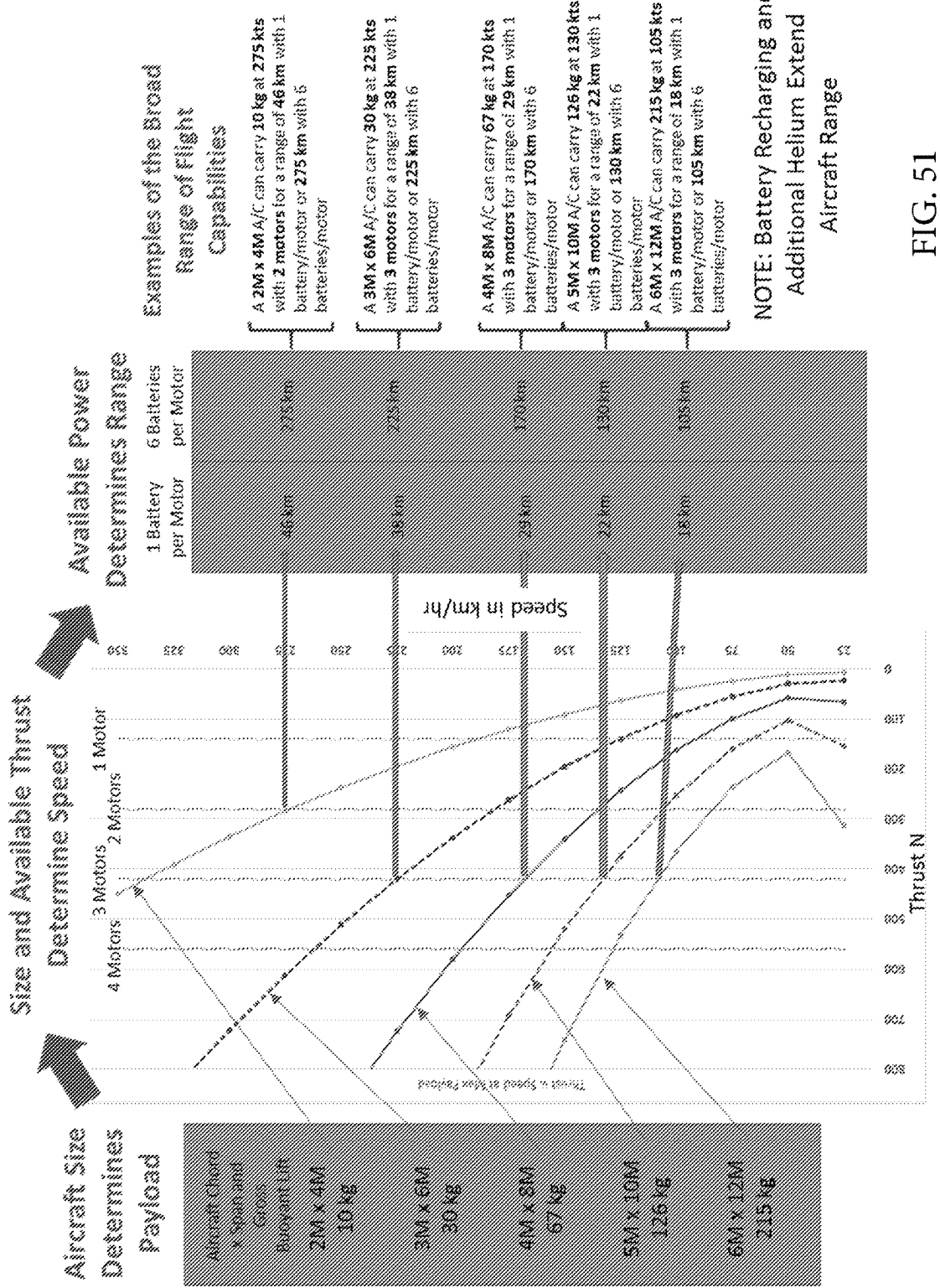
FIG. 51 is a table that provides both specific examples and general characteristics of various configurations.

Among the characteristics of this aircraft is the speed at which the aircraft is capable of traveling when in the dash configuration and powered by a propulsion system. The equation in Table 2 is used to calculate the amount of force required to move a body through a viscous medium. This is used to derive the thrust (and therefore number and size of motors) to achieve the required speed; thus driving other factors such as weight, power, envelope size, etc. The initial calculation is to determine the minimum motor output required to achieve the desired maximum dash velocity of 230 mph at a cruise altitude of 10,000 feet MSL for an aircraft of a specific size. FIG. 51 shows both specific examples and general characteristics of various configurations. Using a mathematical simulation tool, (FoilSim II) available from NASA, the $C_D$ for various configurations of the aircraft from a large chord to length ratio to a small chord to length ration was calculated. As seen in FIG. 51, the low chord to length ratio with a highly symmetric profile yields a curve of thrust required to achieve a velocity and is reflected by curves for each of the example aircraft sizes. Note that aircraft size drives buoyant gas volume and; therefore, maximum payload shown in the FIG. 51 examples. This small chord thickness yields the lowest $C_D$ and therefore, the lowest motor size to achieve the desired speeds. A standard radio controlled motor thrust has been chosen and is indicated by the vertical lines in the thrust portion of FIG. 51 to reflect combinations of multiple motors of the same size. This provides the number of motors required to achieve the desired dash velocity. Given the aircraft size (therefore payload), desired speed, and motor configuration, specific examples are given for predicted operational ranges for various power supply configurations assuming no battery recharging or additional buoyant gas source. The FoilSim model output corresponding to a specific performance case is shown in FIG. 38. It is apparent that the maximum LTA speed in the highly buoyant configuration (high thickness to chord length ratios) will be nowhere near those achieved in the dash configuration. FIGS. 37 and 38 show the output for two of the symmetric configurations examined using the FoilSim simulation program. FIG. 39 shows how $C_D$ increases in the asymmetric configuration while also experiencing a corresponding increase in the coefficient of lift ($C_L$). The data shows that in this configuration, significant aerodynamic lift can be achieved by this design at 0 degree AoA. Higher lift performance can be achieved at higher AoA.

TABLE 2

| | |
|---|---|
| Desired speed in knots: | 200 kts = 102.88 m/sec |
| $Fr = .5(C_D) * \rho_{air} * v^2 * A_s$ | Assume Altitude of 10000 ft and Speed of 250 kts |
| | Altitude 10000 ft = 3048 m |
| | Speed: 230 mph = 200 kts = 370 km/hr |
| 102.88 | v  Velocity (m/sec): in this model, this is an input characteristic and drives the motor size. |
| 0.4135 | $\rho_{air}$  Density of Air: is a function of atmospheric conditions and varies |
| | A  Surface Area (m²) |
| | $C_D$  Coefficient of Drag: using FoilSim III |

Base Structure

Figure 5C:
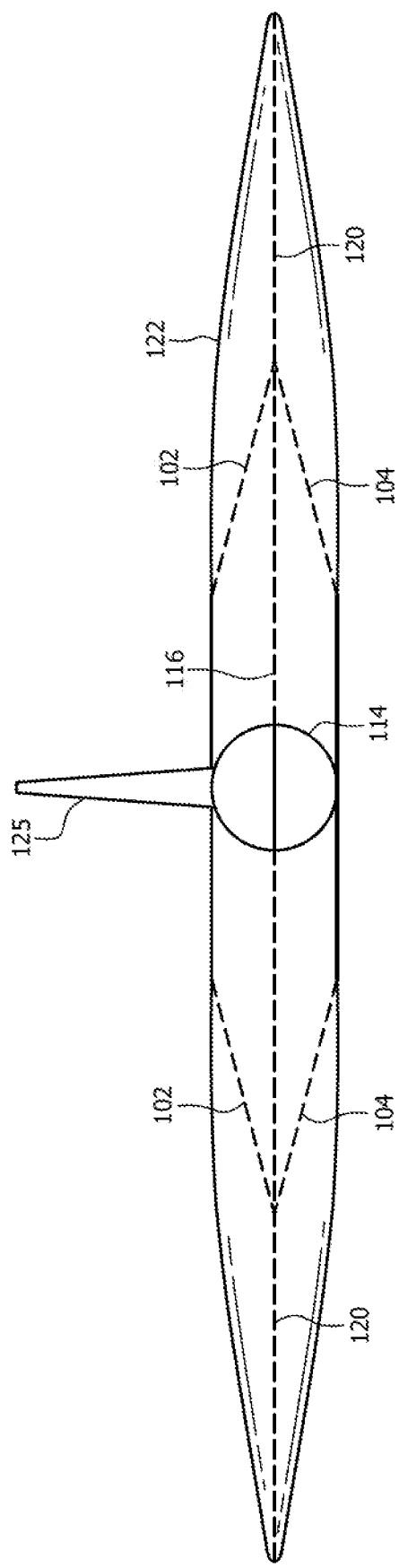
FIG. 5C is a front view of the present invention in the dash configuration.
Figure 6:
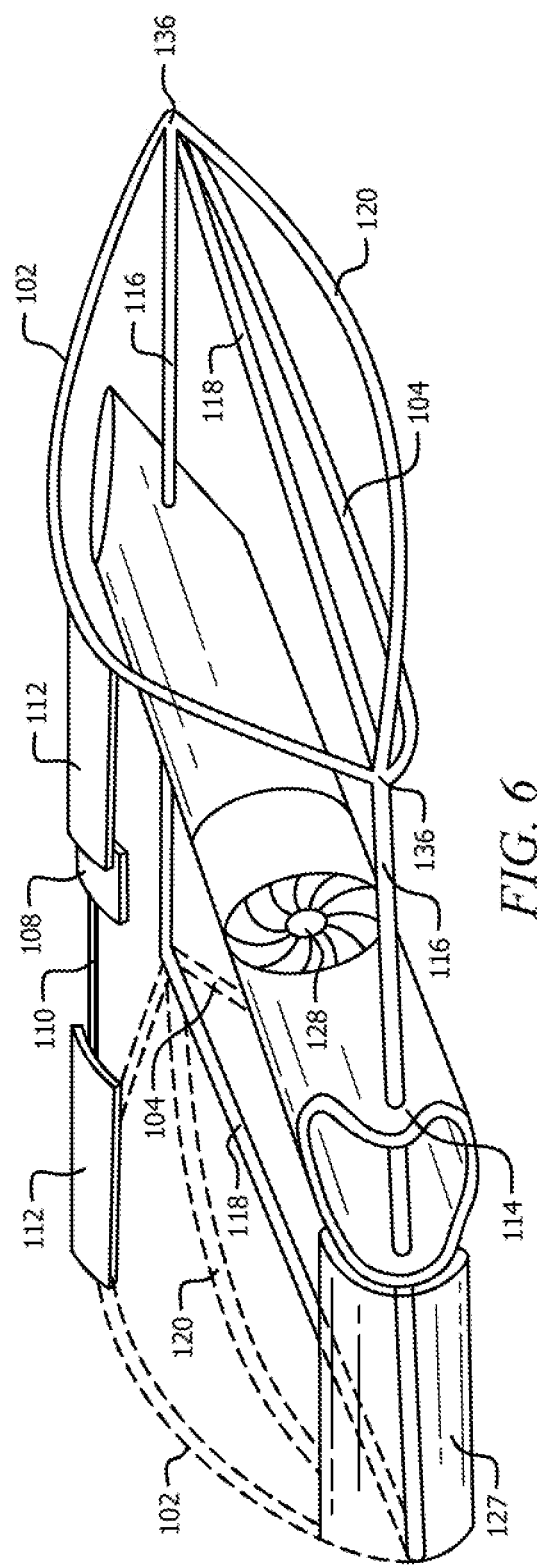
FIG. 6 is a perspective view of an embodiment of the present invention showing the internal structural components of the aircraft.

Referring now to FIG. 6, the base structure of an embodiment of the aircraft includes a generally rectangular frame comprising of leading and trailing edge struts 116 connected to port and starboard outriggers 118. Core(s) 114 also serve as a key structural base by helping support the leading and trailing edge struts 116. The two outriggers 118 are preferably generally parallel to core 114 and leading and trailing edge struts 116 are generally perpendicular to core 114 however, swept configurations are also considered. Outriggers 118 provide structure as well as an attachment point for mounting moveable longerons 102 and 104 and slack managers 120. It should be noted that leading and trailing edge struts 116 may pass through core 114 as shown in FIGS. 1-10 or may be disposed above or below core 114 as depicted in FIGS. 18, 19, and 43-46.

Connection points 136 interconnect leading and trailing edge struts 116 with outriggers 118. If the aircraft is viewed from the perspective of two halves—a port and starboard side, each half/side includes a pair of structural connection points 136. In addition, each side of the aircraft includes a slack manager 120 and a pair of moveable longerons—moveable upper longeron 102 and moveable lower longeron 104. As illustrated best in FIGS. 7-8, slack manager 120 and longerons 102 and 104 are also connected to the structural connection points 136.

Figure 7:
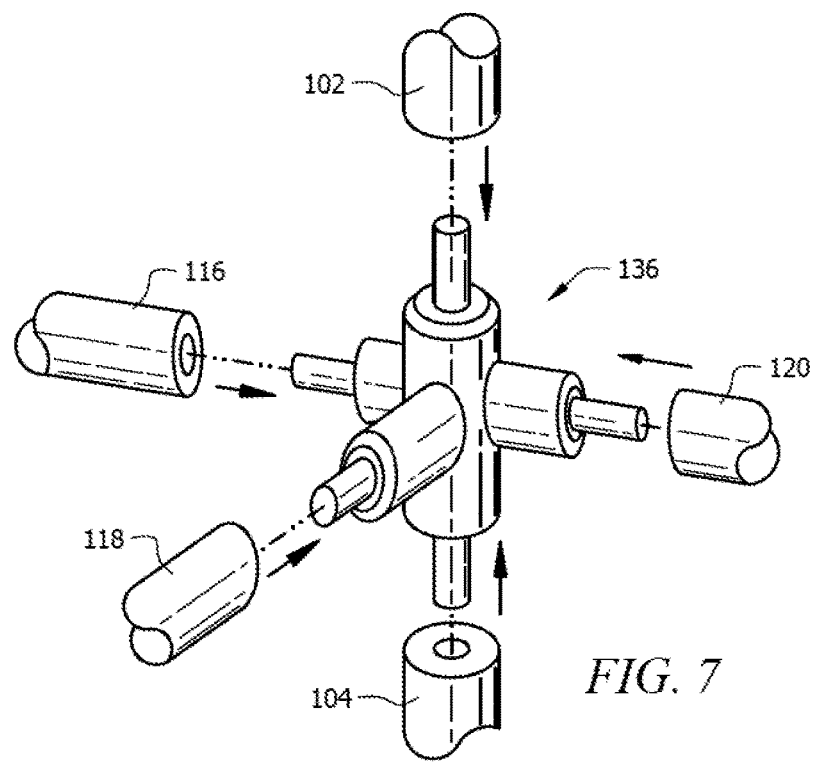
FIG. 7 is an exploded view of an embodiment of a structural connection point.

Referring now to FIG. 7, an embodiment of structural connection point 136 includes five connections, excluding a connection for an additional support member. The connections of moveable longerons 102 and 104 and the connection for slack manager 120 are pivoting connections, such as ball joints. Strut 116 and outrigger 118 connections are preferably fixed connections. The pivoting connections for moveable longerons 102 and 104 and slack manager 120 aid in the convertibility of the aircraft. The fixed connections of strut 116 and outrigger 118 aid in the rigidity of the base structure to improve the aircraft's ability to operate under the typical forces and stresses associated with flight. In an embodiment, the connection for slack manager 120 is spring loaded to produce tension on slack manager 120 in turn transferring the tension onto the envelope; thereby removing slack in the dash configuration.

Figure 8:
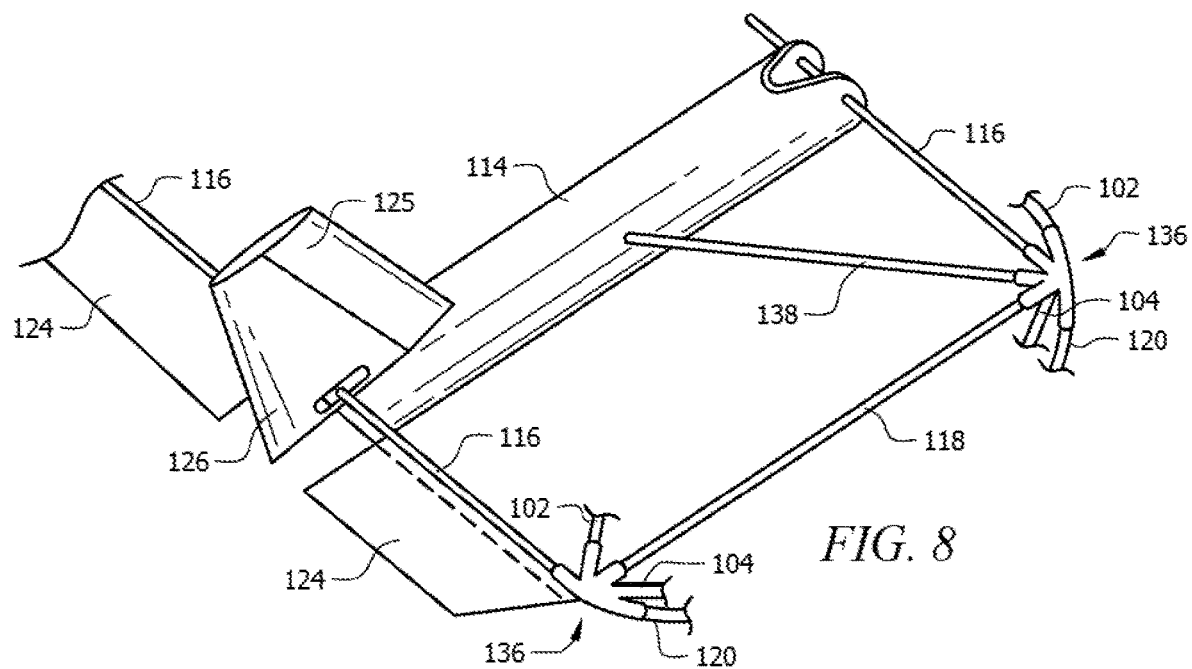
FIG. 8 is a rear perspective view of the starboard side of an embodiment of the present invention showing the internal structural components of the aircraft.

In an embodiment, as shown in FIG. 8, the base structure may include an additional support member 138. Support member 138 is included to increase the rigidity of the base structure and may be connected to the base structure at any location known to a person having ordinary skill in the art, such that the structure improves rigidity. Multiple support members may be included depending on aircraft configuration. It should be noted that the base structure would include support structure 138 on both the port and starboard sides of the aircraft, but FIG. 8 is limited to the starboard section of the aircraft to reduce clutter.

Also illustrated in FIG. 8 is the open space between core 114 and outrigger 118. This open space allows for the storage of the additional systems that will likely be used in operation. The additional systems are preferably mounted to the core 114 and may include, but are not limited to batteries, computation devices including the navigation system, control computer, battery charger and control device, navigation, servo motors, internal payload elements, buoyant gas and structural components for the envelope.

Figure 9A:
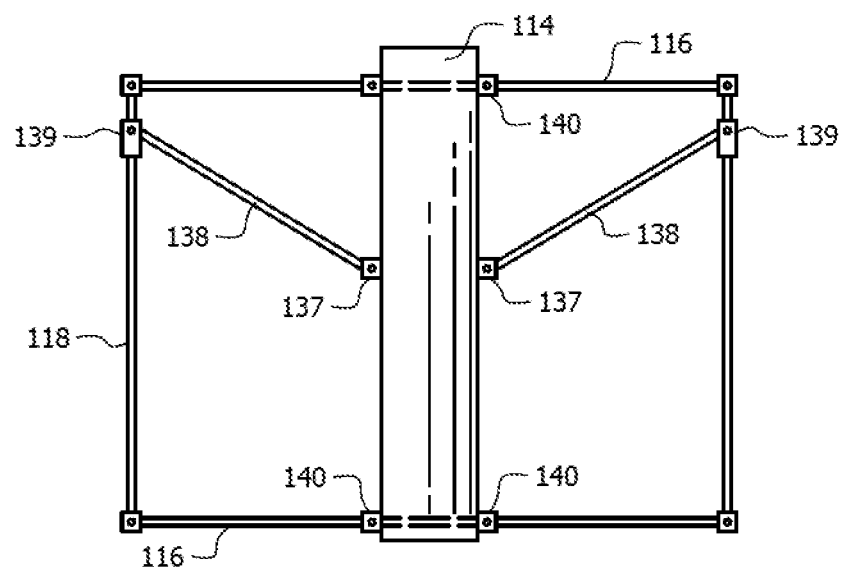
FIG. 9A is a top view of the internal base structure of an embodiment of the present invention.
Figure 9B:
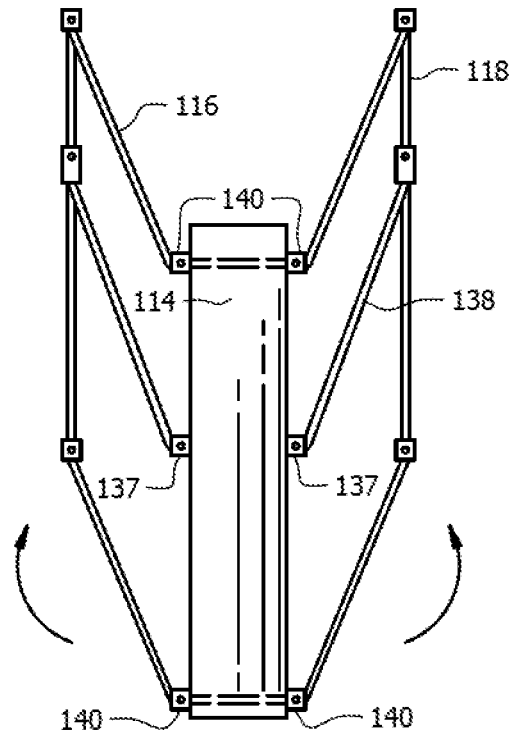
FIG. 9B is a top view of the internal base structure of an embodiment of the present invention shown in a folded configuration.

Referring now to FIGS. 9A and 9B, an embodiment includes strut-to-core connection points 140 and support member-to-core connection points 137. Connection points 140 pivotally connect struts 116 to core 114, and connection points 137 pivotally connect support members 138 to core 114. As a result, the base structure of the aircraft can fold to a more compact orientation and improve transportability of the aircraft. FIG. 9B also illustrates an embodiment having slideable outrigger-to-support member connection points 139, which slides along outrigger 118 to aid in folding the aircraft.

Figure 10:
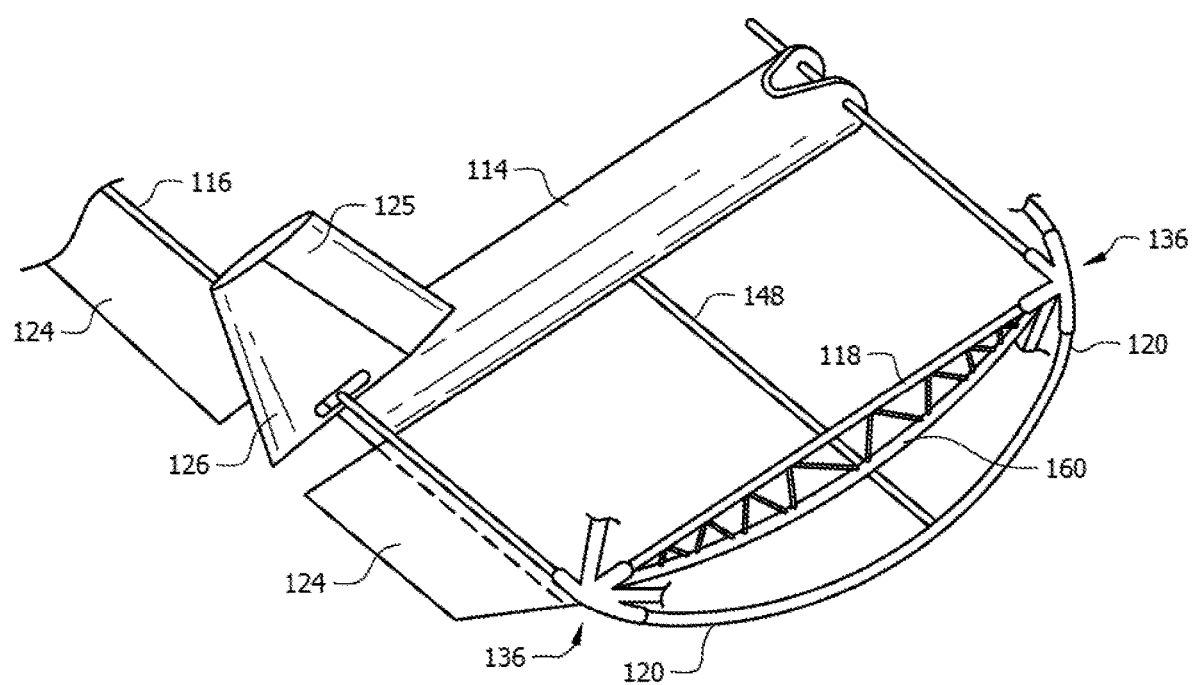
FIG. 10 is a rear perspective view of the starboard side of an embodiment of the present invention showing the internal structural components of the strap spar and spreading rib version of the aircraft.

Referring now to FIG. 10, an embodiment of the base structure includes a wing load management system. Note that FIG. 10 provides only the starboard side in an attempt to improve the clarity of the figure. The wing load management system is designed to accommodate payloads having a weight many times greater than that of the aircraft. Additionally, the system helps maintain the aircraft's center of gravity/weight and balance as well as maintain the underside airfoil shape critical to aerodynamic performance. The system includes one or more strap spars 148 extending in the span direction. Note that the Strap Spars do not communicate with the Longerons or impede their motion. Strap spars 148 are preferably flexible and made from Kevlar, or a similar strong, flexible, and lightweight material. Strap spars 148 extend from core 114 to slack manager 120 on either side of the aircraft to provide wingtip-to-wingtip load distribution. The flexibility of strap spars 148 allow the slack managers to contract inward towards the core when converting to the LTA configuration.

Strap spars 148 preferably pass underneath one or more support riblets 160, having an arc or airfoil shape, to maintain the airfoil shape and further decrease wingtip curvature under heavy loading. The wing load management system may also include support ribs (not shown) running between leading and trailing edge struts 116 on either side of core 114 acting as load distributors aiding in maintaining the underside airfoil contour. In an embodiment, the support ribs and strap spars 148 may be intertwined as is known by a person having ordinary skill in the art to further increase load distribution.

Polyhedral Wing Shape

Figure 11:
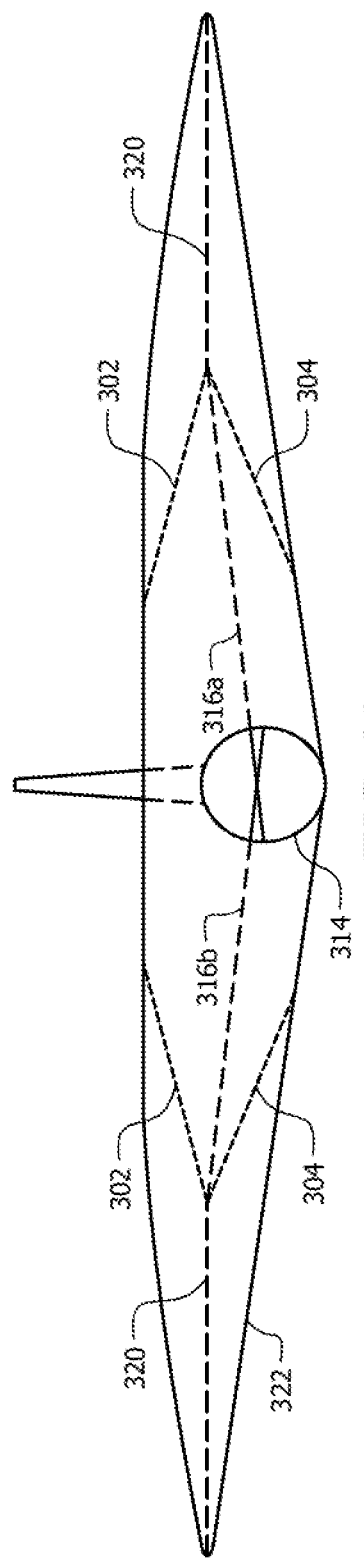
FIG. 11 is a front view of an embodiment of the present invention having a dihedral wing shape.
Figure 12:
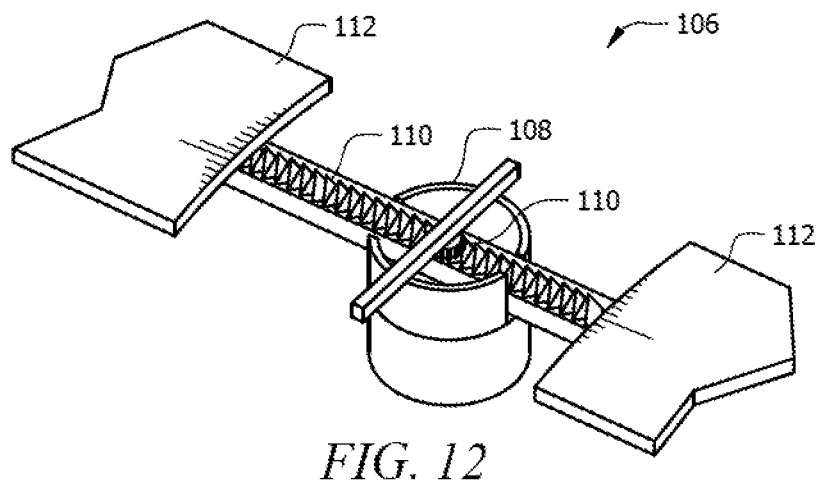
FIG. 12 is a perspective view of an embodiment of a mechanically driven version of the upper translation assembly.
Figure 13A:
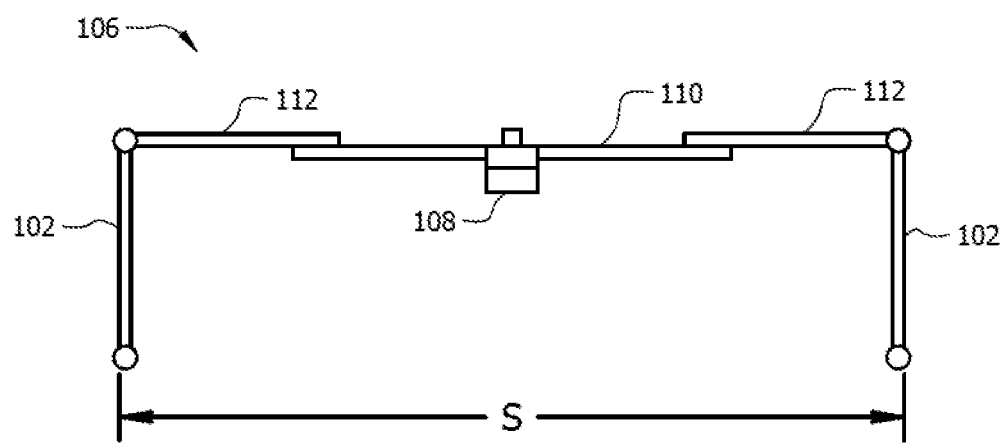
FIG. 13A is front view of an embodiment of the gear driven upper translation assembly in an extended configuration.
Figure 13B:
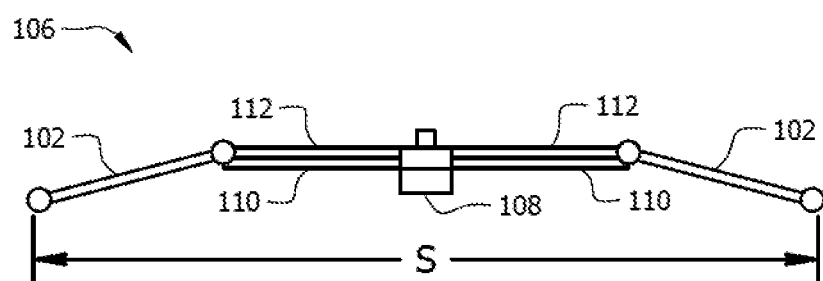
FIG. 13B is front view of an embodiment of the gear driven upper translation assembly in a retracted configuration.

In an embodiment, the leading edge strut and/or the trailing edge strut may each be curved or may each comprise of a two or more structural members creating independent port side and starboard side struts. As a result, the HTA configuration has a wing shape, such as a polyhedral wing shape, that is angled with respect to the local horizontal. As shown in FIG. 11, port side struts 316a and starboard side struts 316b are attached to core 314 at a positive angle with respect to the local horizontal resulting in a dihedral. The angle may vary in magnitude and direction depending on the required aerodynamic performance. The leading edge and/or trailing edge struts may also be oriented so that they are not perpendicular to the core yielding a swept leading and/or trailing edge.

Adjustable Longerons

The movement or adjustment of the longerons alters the camber/thickness of the upper and/or lower surfaces to achieve differing body shapes. The longerons are non-linear, preferably having a curved shape. As a result of the curvature, each longeron has a vertex—the local maximum or peak of the curvature of the longeron. The vertex is a point along the curvature of the longeron that is furthest from the lateral axis of the aircraft at any given time or orientation. The longerons are adjustable to vary the distance the vertex extends from the lateral axis of the aircraft. In an embodiment, the longerons have a fixed length to decrease complexity of the aircraft, however, length-adjusting longerons are also considered.

In an embodiment, the longerons may have a common pivot point, such that the longerons have a generally V-shape orientation with respect to each other when viewed from above. The common pivot point could be located towards the front and/or rear of the aircraft. Additionally, the lower longerons may also have a common pivot point located towards the front or rear of the aircraft. The V-shaped orientation doubles the number of skin support points with a possible reduction in flutter. This may be replicated at multiple points along the span to increase skin shape management.

Rigid Translation Assembly

In an embodiment, as best shown in FIGS. 1-5, moveable longerons 102 and 104 are adapted to pivot between a generally vertical orientation and a generally horizontal orientation. By pivoting, the distance between the lateral axis and the vertices can be adjusted, which in turn adjusts the aircraft's thickness. The orientation of moveable longerons 102 and 104 is controlled by a camber-adjustment assembly (also referred to as a translation assembly). The translation assemblies can be mounted both above and below the core of the aircraft allowing both the top and bottom halves to change in shape and thickness. Moveable upper longerons 102 and moveable lower longerons 104 are each in communication with upper translation assembly 106 and lower translation assembly 107, respectively.

Referring to FIGS. 12-17, the translation assemblies each include motor 108, gear assembly 110, and extendable arms 112. In an embodiment, the center of gear assembly 110 is attached to the envelope to aid in maintaining proper envelope positioning. As shown in FIG. 17A, extendable arms 112 are attached to upper moveable longerons 102. When upper translation assembly 106 is in the extended configuration, upper moveable longerons 102 are in a generally vertical orientation. Contrastingly, FIG. 17B shows upper translation assembly 106 in the retracted configuration, with the moveable longerons 102 pulled inwardly towards motor 108.

Figure 14:
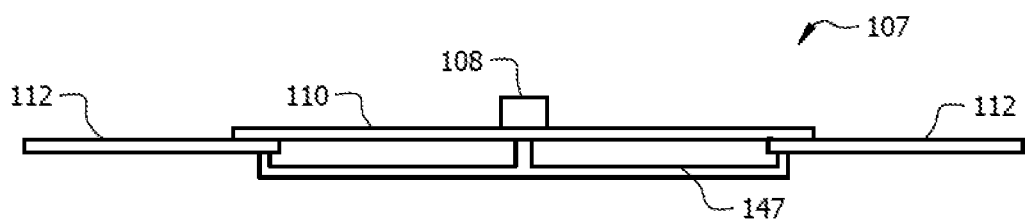
FIG. 14 is a front view of an embodiment of the lower translation assembly, having a payload hard point, while in an extended orientation.
Figure 15:
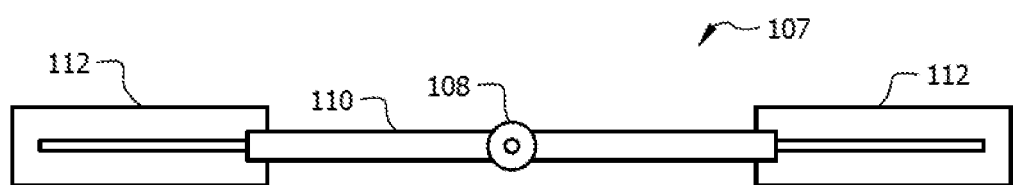
FIG. 15 is a top view of FIG. 14.
Figure 16:
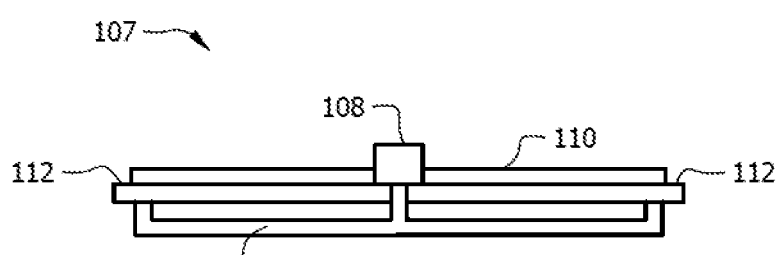
FIG. 16 is a front view of the lower translation assembly shown in FIG. 14 while in a retracted orientation.
Figure 17:
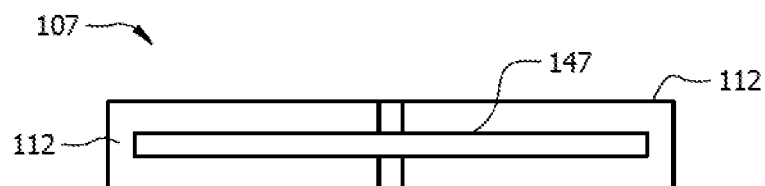
FIG. 17 is a bottom view of FIG. 16.

Referring now to FIGS. 14-17, an embodiment includes payload hard points 147 on translation assemblies 106 and 107. Most commonly, the hard point would be located on the lower translation assembly 107. FIGS. 14 and 15 show lower translation assembly 107 in the extended configuration and FIGS. 16 and 17 show the translation assembly in the retracted configuration. Payload hard points 147 provide an attachment structure for securing payloads to the exterior of the aircraft envelope. In an embodiment, payload hard point 147 on lower translation assembly 107 is externally located with respect to the envelope. In this embodiment, extendable arms 112 are in communication with lower moveable longerons inside of the envelope while payload hard point 147 extends downwards and out of the envelope allowing certain payloads to be attached outside of the envelope.

Strap Translation Assembly

Figure 18:
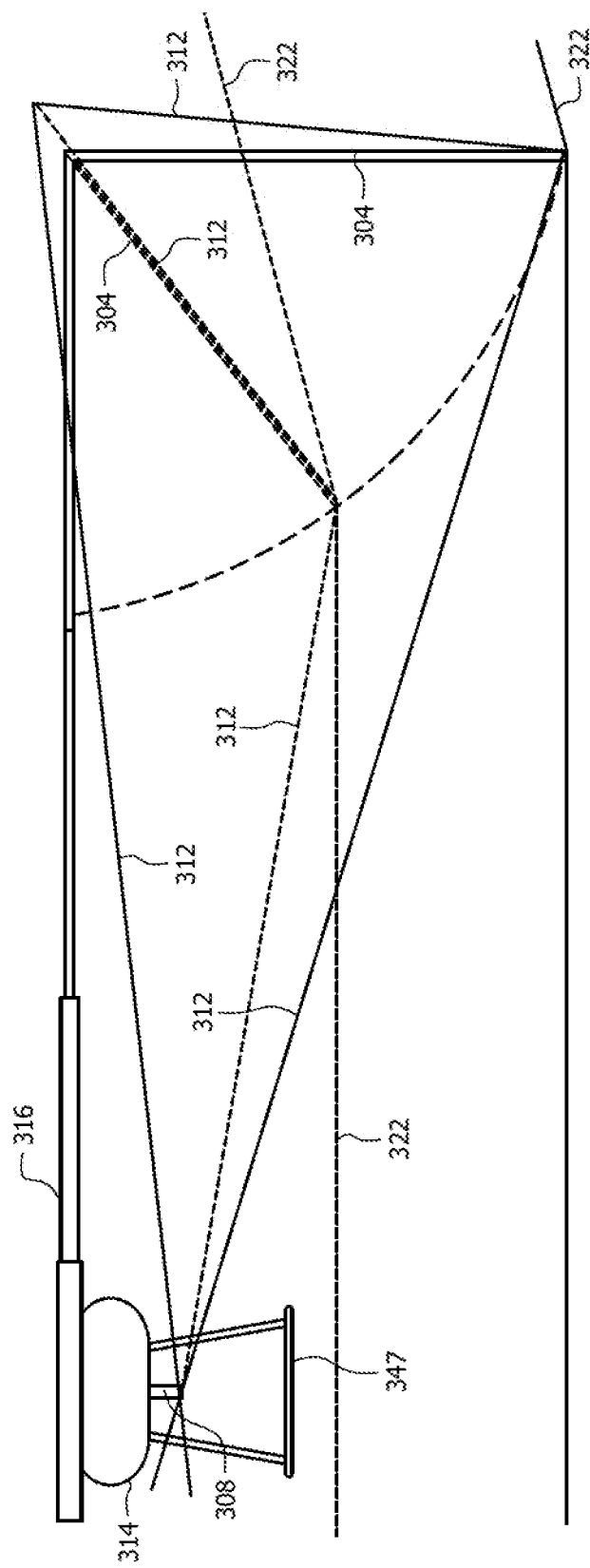
FIG. 18 is a partial front view of an embodiment of the aircraft employing the flexible translation assembly illustrating the movement of a bottom longeron, from a vertical orientation, towards the core of the aircraft as the translation strap rotates in a clockwise direction. The figure also illustrates a telescoping leading and trailing edge embodiment.
Figure 19:
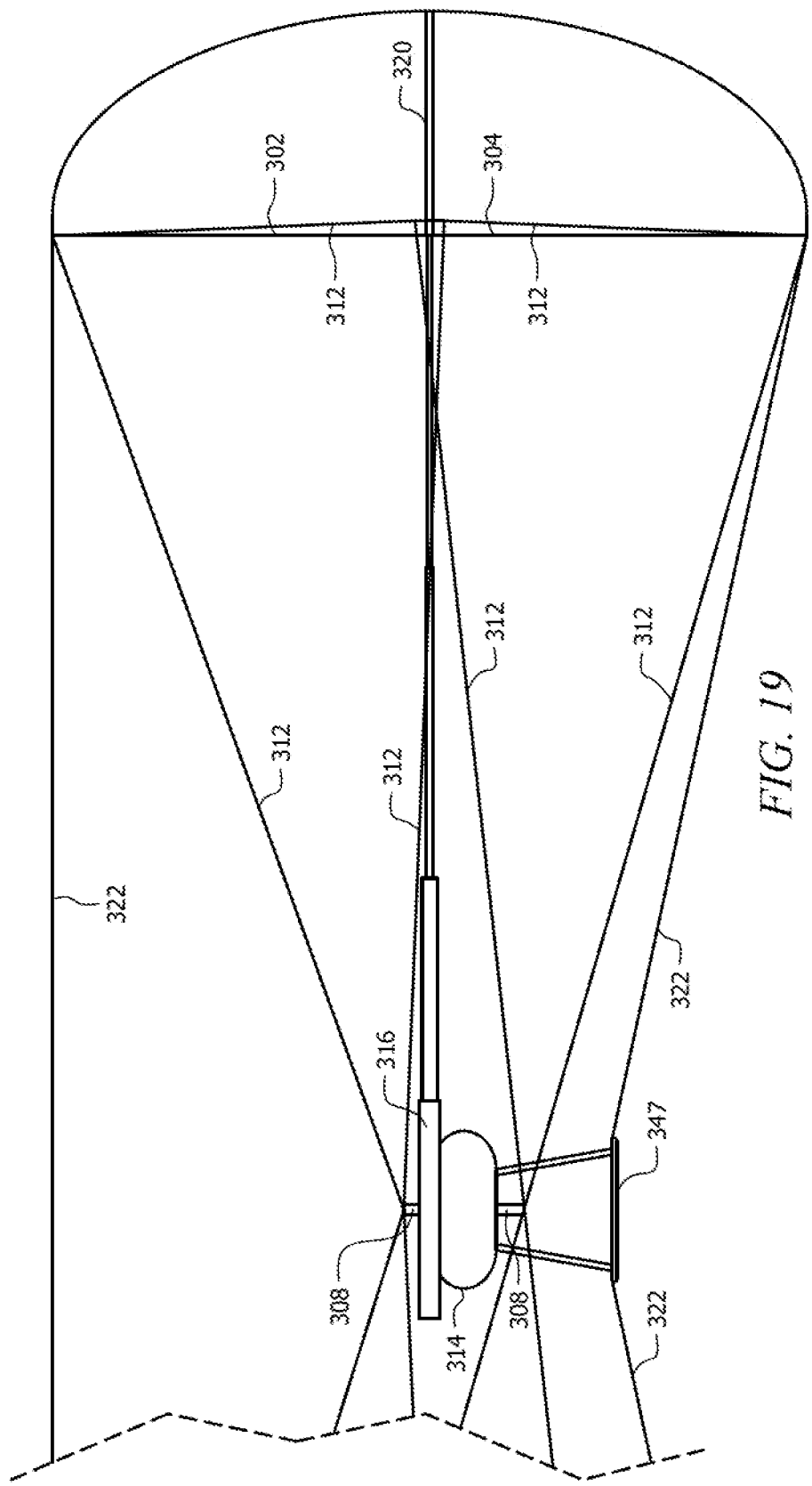
FIG. 19 is a partial front view of the port side of an embodiment of the aircraft highlighting the flexible translation assemblies and the flexible envelope attached to the external payload hard point.

Referring now to FIGS. 18-19, an embodiment may use a strap-based translation assembly. FIG. 18 provides a bottom port side sectional view of the embodiment employing the flexible translation assemblies. The embodiment preferably includes an upper translation assembly (not shown to reduce clutter) and a lower translation assembly each having motor 308 in communication with port and starboard side translation straps 312. Motor 308 is located near, and preferably attached to, core 314. Note that there is an analogous arrangement on the starboard side.

Figure 49:
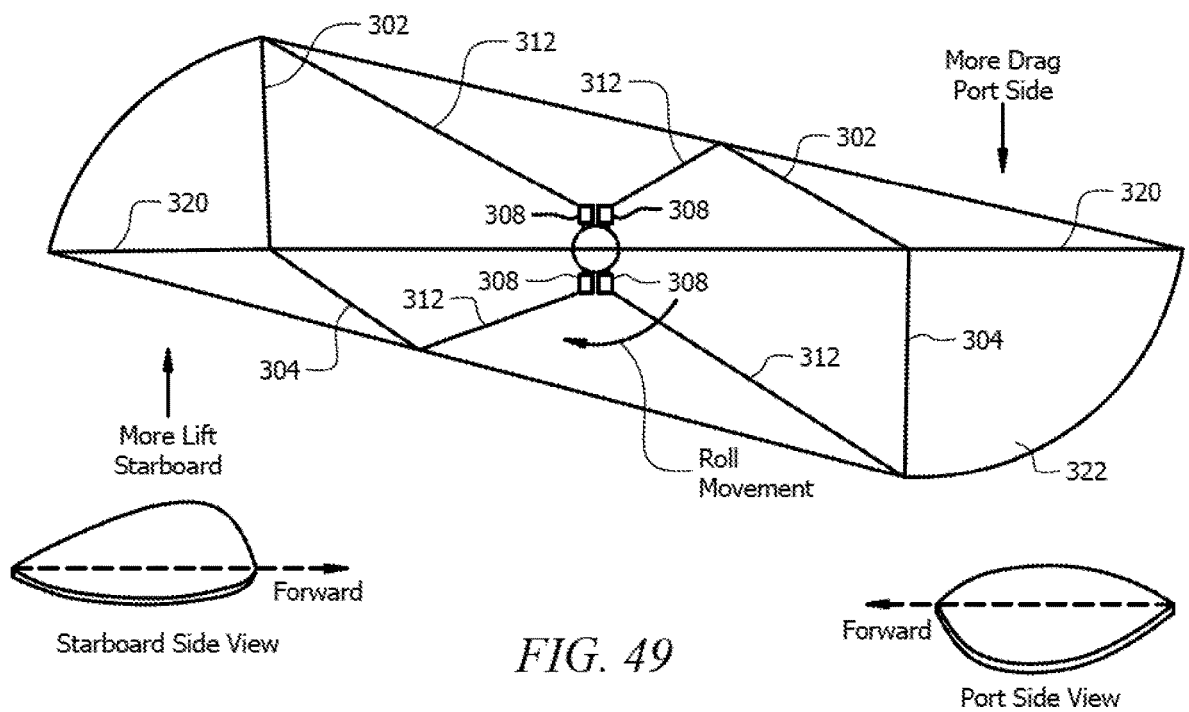
FIG. 49 is a front view of an embodiment employing two upper translation assemblies and two lower translation assemblies to provide quadrant-based camber manipulation.

Referring now to FIG. 49, independent upper and lower translation assemblies allow the aircraft to alter the camber of the top and bottom of the aircraft independently. An embodiment may include independent port and starboard side translation straps. As a result, the embodiment has the ability to independently vary the shape of each of the aircraft's four quadrants—a top starboard quadrant, a top port quadrant, a bottom starboard quadrant, and a bottom port quadrant. This embodiment allows for roll and pitch control of the aircraft as shown in FIG. 49.

Figure 50:
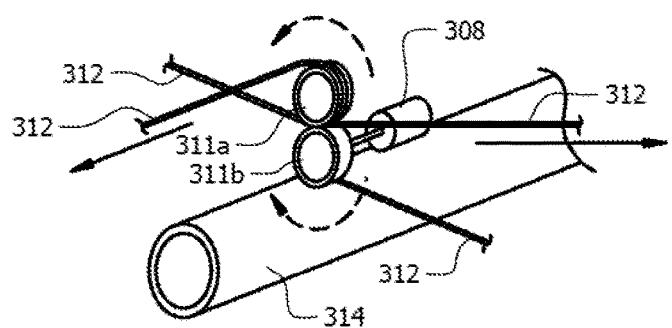
FIG. 50 is a perspective view of an embodiment of the upper translation assembly having a single motor operating two pulleys to simultaneously alter the orientation of the upper port and starboard side longerons.

In an embodiment shown in FIG. 50, the upper translation assembly and lower translation assembly each include a motor having two pulleys in communication with one another, such that the rotation of one pulley results in the opposite rotation of the other pulley. One pulley is in communication with the starboard translation strap, while the other pulley is in communication with the port side translation strap. Thus, the motor on the upper translation assembly controls the upper translation assembly and the motor on the lower translation assembly controls the lower translation assembly, creating two independent halves, as shown in FIG. 49.

As shown in FIGS. 18 and 19, each translation strap 312 is a continuous loop fixed at one of the longerons (either the upper longeron 302 or lower longeron 304 depending on the location of translation strap 312). The continuous loop is in communication with motor 308 and passes around outrigger 318. Motor 308 is adapted to rotate continuous translation strap 312 in either a clockwise or a counterclockwise direction, to cause the translation strap to pull the attached longeron either towards or away from core 314.

FIG. 18 provides a sectional view of the bottom port side of the aircraft to highlight the movement of longeron 304 with the rotation of translation strap 312. As motor 308 rotates translation strap 312 in a clockwise direction, longeron 304 is pulled towards core 314 to decrease the camber and alter flight characteristics. In a similar manner, the direction of rotation can be reversed to pull longeron 304 away from core 314. To maintain constant tension, an embodiment may include a spring loaded recoil system to maintain constant tension in the translation straps.

It is contemplated that the motor may be located anywhere on the aircraft and the translation strap may pass through a pulley located near the outrigger rather than passing around the outrigger itself. Furthermore, translation strap may be linear rather than a continuous loop with one end attached to the longeron and the other in communication with the motor. Such an embodiment would require an additional mechanism to force the longeron away from the core when the tension in the translation strap is decreased. It should be noted that the continuous translation strap fixed at the longeron also provides structural support as a spar strap.

The strap translation assembly may employ any number of motors and translation straps to improve the ease of re-orienting the longerons. An embodiment may include two straps for each side of the translation assembly. For example, the upper portside translation assembly may have two translation straps secured to the upper portside longeron. A first translation strap may be fixed on the upper longeron closer to the aft end of the longeron and a second strap would be fixed on the upper longeron closer to the fore end of the longeron. As an added benefit, each translation strap may communicate with an independently operated motor, thereby allowing the aircraft to warp the wing between the fore and aft ends of the aircraft.

Non-Pivoting Longerons

An embodiment may include longerons secured to the base structure through a non-pivoting connection point. Rather than alter the camber by pivoting between a generally vertical orientation and a generally horizontal orientation, the longerons alter the camber and aircraft thickness by altering the distance in which the longerons project outwardly from the base structure of the aircraft. In an embodiment, the longerons include at least two sections telescoping with respect to each other, such that the length can be adjusted. The adjustable length allows for the alteration of the distance that the vertices of the longerons extend outwardly from the base structure. The longerons have an effective maximum length, which occurs when the envelope is fully inflated, and an effective minimum length, which occurs when the aircraft is in the dash mode.

Figure 20:
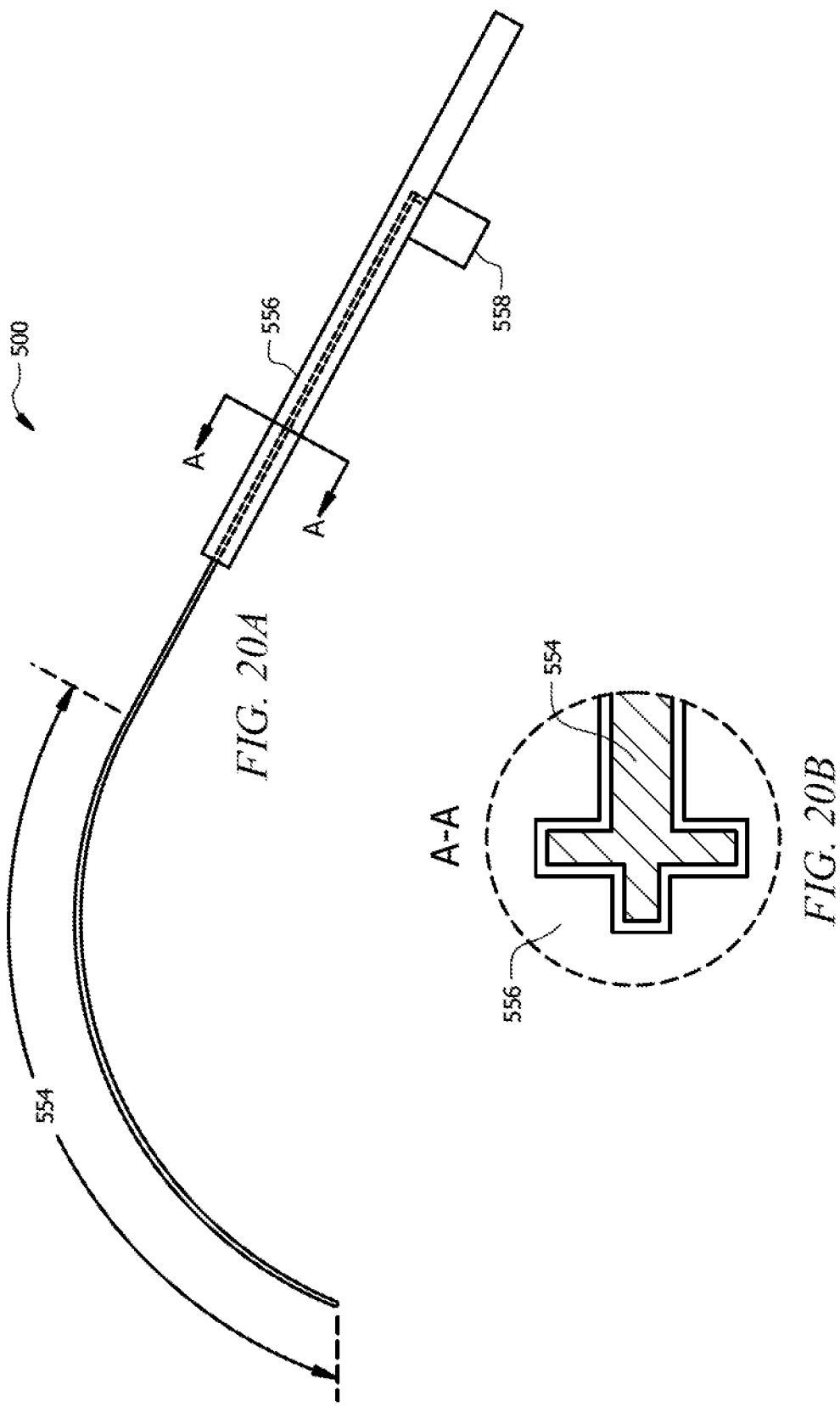
FIG. 20A is a side view of an embodiment of a mechanically driven non-pivoting longeron.
FIG. 20B is a sectional view of the embodiment in FIG. 20A.

As shown in FIG. 20, an embodiment of non-pivoting longerons 500 includes first flexible section 554 in telescoping communication with semi-rigid or rigid section 556. Rigid section 556 is located towards the aft end of the aircraft where the longeron experiences minimal shape alteration to account for the rigidity of the section. Gear assembly 558 is secured at some point along the fore half of rigid section 556 and is in communication with flexible section 554. As the gear in gear assembly 558 rotates, the location of flexible section 554 translates with respect to rigid section 556 such that the total length of longerons 500 is adjustable. Longeron 500 is at a minimum length when flexible section 554 is fully retracted within rigid section 556 and is at a maximum length when flexible section 554 is fully extended from rigid section 556. While a gear assembly is described, it is considered that any mechanical drive capable of altering the relative location of two telescoping members may be used.

As shown in FIG. 20B, the cross-section of flexible section 554 may have a T-shape. The T-shape provides an increase in the structural stability and aids in preventing rotation of flexible section 554 with respect to rigid section 556. A T-shape is illustrated but other forms may be incorporated to manage loads.

Figure 21:
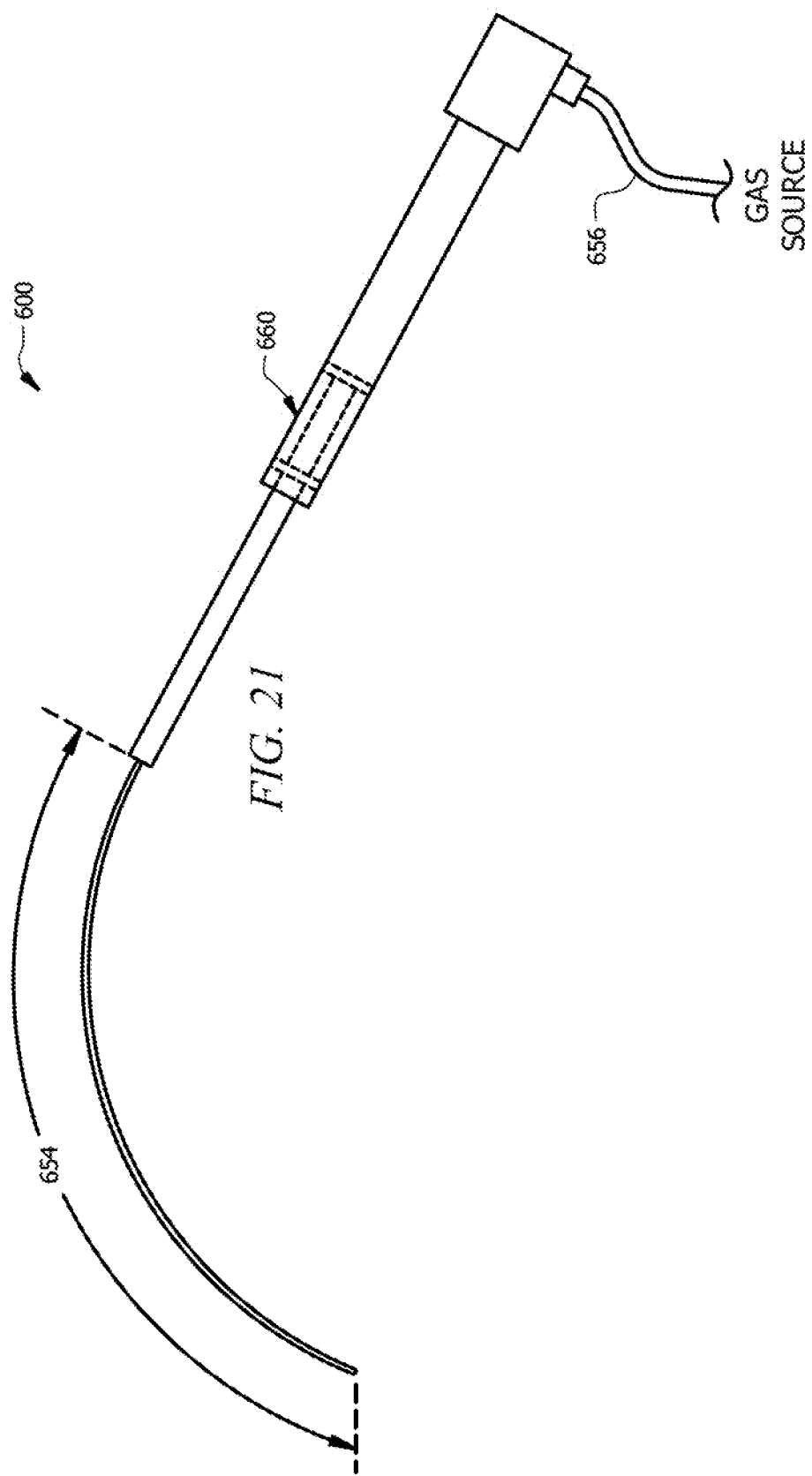
FIG. 21 is a side view of an embodiment of a non-pivoting longeron.

As shown in FIG. 21, an embodiment of non-pivoting longeron 600 includes piston 660 driving flexible section 654. Piston 660 can be any type of piston, such as a pneumatic or hydraulic piston. Piston 660 is in fluid communication with a fluid tank (not shown) through conduit 656, and an electronic valve controls the fluidic pressure during operation. Piston 654 is located towards the aft end of the aircraft where the longeron experiences minimal shape alteration to account for the rigidity of the piston.

An embodiment of the non-pivoting longeron may include an extension member having one end secured to a longeron and the other end secured to the base structure of the aircraft. The extension member can increase in length such that the longeron is extended outwards away from the lateral axis of the aircraft when the extension member increases in length. Similarly, the longeron will be pulled inwardly towards the lateral axis of the aircraft when the extension member decreases in length. In addition, the extension member may be angled from the center or back half of the base structure towards the front half of longeron. The specific attachment location and angle of the extension member can be calculated to provide an optimum resistance to the aerodynamic forces applied on the longerons during flight.

Slack Managers

Figure 4A:
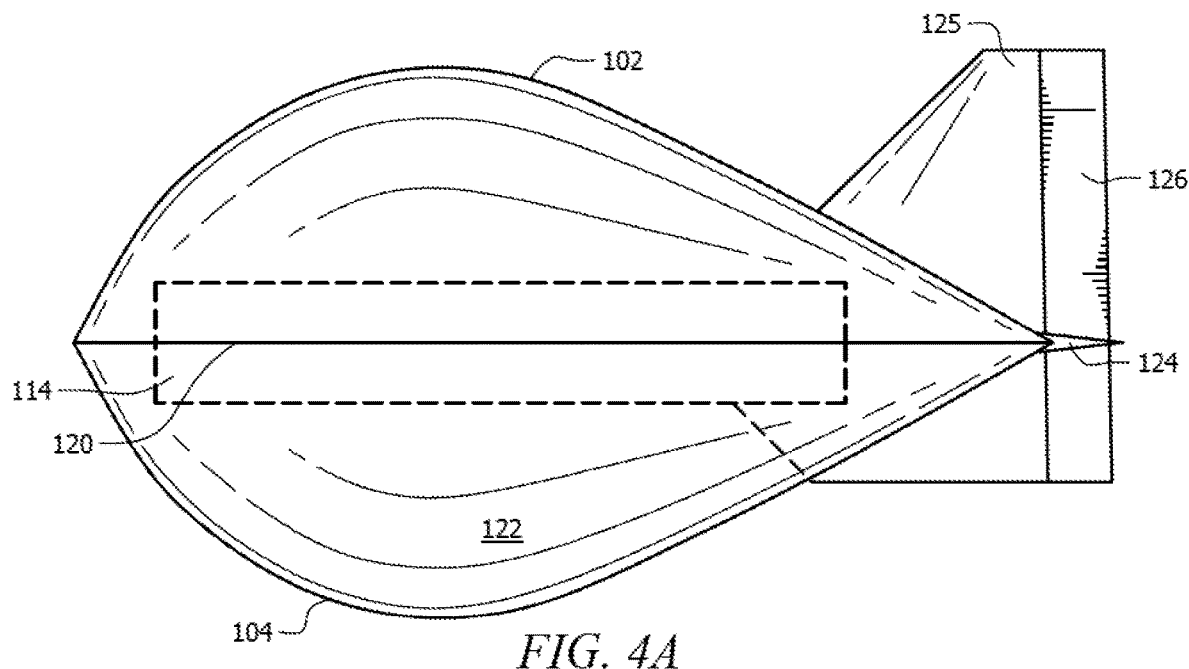
FIG. 4A is a side view of the present invention in an LTA configuration.
Figure 4B:
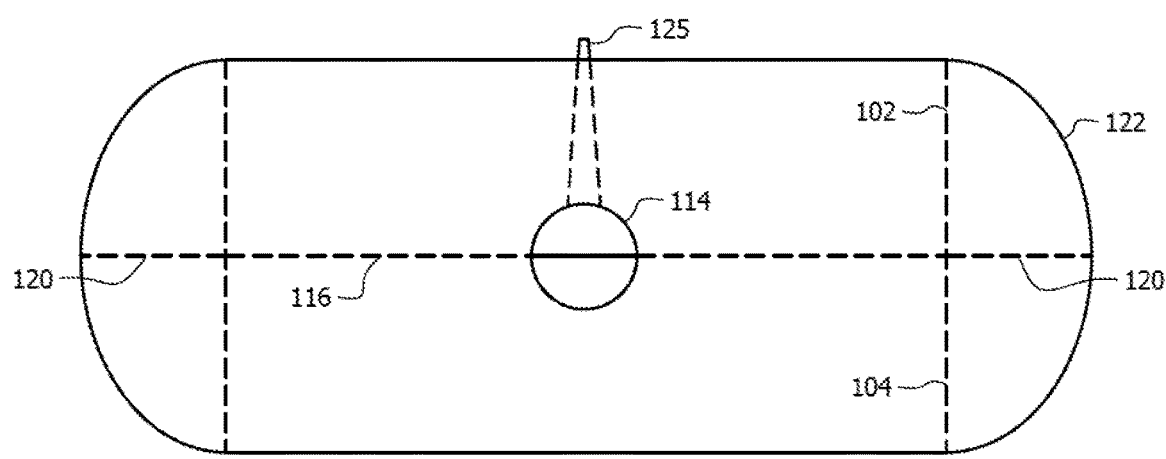
FIG. 4B is a front view of the present invention in an LTA configuration.

As the longerons transition from a thick camber, as shown in FIG. 4B, towards a thin camber position, as shown in FIG. 5C, slack managers 120 extend outward to keep envelop 122 taught. As a result, slack managers 120 ultimately increase the span of the aircraft as seen in comparing FIG. 5C to FIG. 4B. In reversing the orientation of moveable longerons 102 and 104 from a thinner camber position to a thicker camber position, envelope 122 overcomes the biasing force imposed on slack managers 120 causing slack manager 120 to shorten in length, which ultimately decreases the span of the aircraft and maintains envelope tension.

Slack managers 120 may be employed to remove slack in the flexible envelope to enable high speed flight with minimum envelope flutter. On the smaller sized aircraft, slack managers 120 comprise of telescoping tubes and tension is provided through spring loaded features on the structural connection points 136. On larger versions, however, the telescoping tube design is likely less effective than the use of a unique anisotropic beam as shown in FIG. 22.

The anisotropic beam includes two or more composite rods (preferably a three-rod configuration) with spring steel cross members embedded into the structure. The spring constant (controlled by material and length) varies across the length of the beam to provide variable tension on the envelope to compensate for the pressure on the envelope. One or more of the composite rods interfaces with the pivot joint assembly at both ends to provide the source of the tension while the other rod(s) are anchored against the pivot structure. Any twisting or translation of the rods relative to each other is prevented by the spring steel cross members. The design allows different spring constants to be used along the length of the structure by adjusting the stiffness and lengths of the cross members, As a result, the pressure on the envelope at the tips and trailing edge can be significantly reduced while pressure at the leading edge can be maintained. This feature provides superior tension control with a lightweight structure and significantly reduces envelope flutter in the dash mode.

Figure 22:
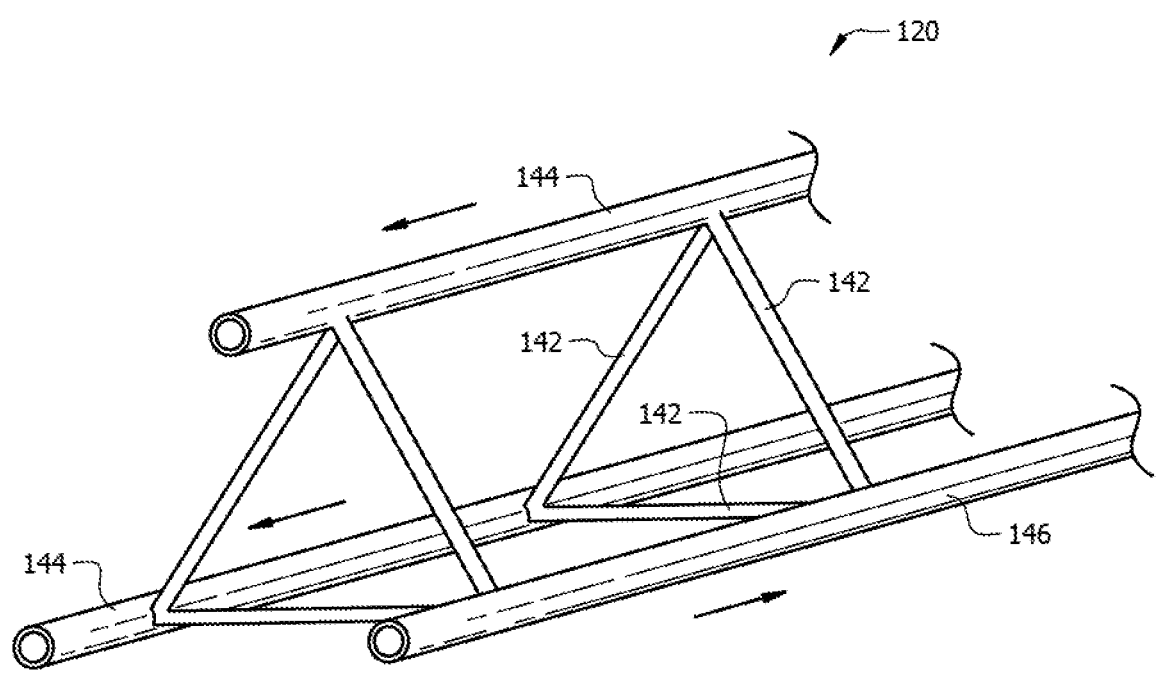
FIG. 22 is an embodiment of the slack manager.

As illustrated in FIG. 22, the cross section of slack manager 120 is preferably triangular in shape with two rods 144 fixed to cross member trusses (made up of cross members 142) and a third rod 146 slidably attached to the cross member trusses. This unique assembly provides slack manager 120 with a variable length while also allowing for varying structural support depending on the strength of the individual cross member trusses located along the length of slack manager 120. This design may also incorporate a telescoping connecting rod to the aft joint for continuity of wing tip shape.

Envelope

The variability of the aircraft imposes several requirements on flexible envelope 122. For example, flexible envelope 122 must be flexible to accommodate the shape morphing capability, have a very low permeability to Helium, and be lightweight. As a result, the envelope is preferably made from a plastic sheet material. This material is prone to two negative features that will affect the performance of the LTA in the dash configuration and impact performance overall. One is flutter of the envelope, which increases drag and causes aerodynamic instability. The second is the possibility of penetration of the envelope by airborne hazards (such as insects, birds, or debris) at the high speeds.

The possibility of penetration may be avoided by the installation of leading edge shields 127 that are hinged on the leading edge strut and can expand or contract with the movement of the envelope. See FIG. 1. Additionally, mechanical stops can be installed to reflect the shape of the leading edge in the dash configuration to remove the possibility of flutter at high speeds. Flutter may also be reduced by management of internal gas pressure and/or the addition of multiple longerons or other internal structural elements.

Figure 23:
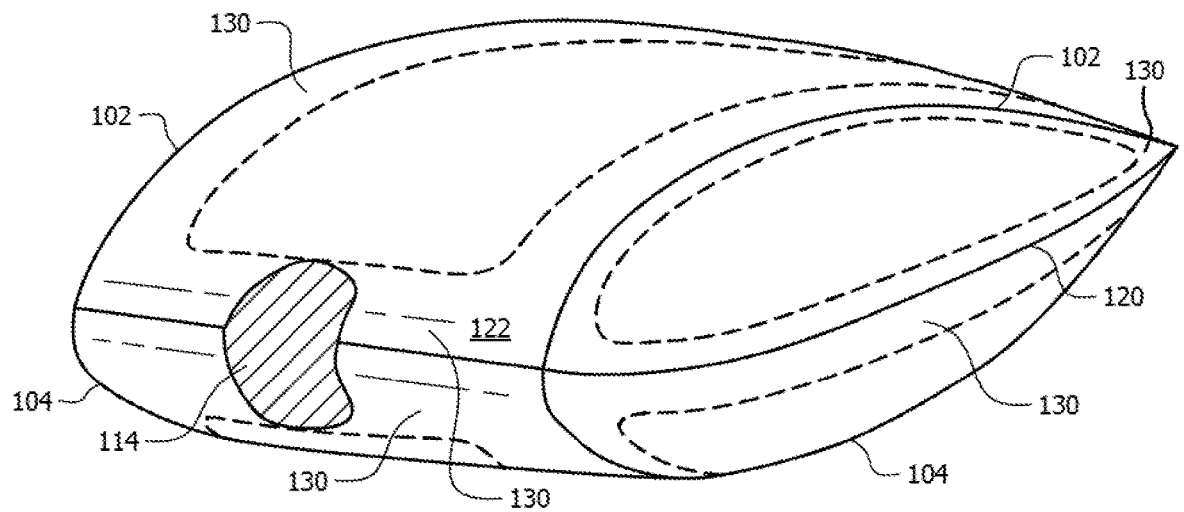
FIG. 23 is a perspective view of an embodiment of the present invention illustrating the preferable location of reinforcement layers.

Referring now to FIG. 23, an embodiment of envelope 122 includes internal reinforcement layer 130 and a secondary containment bag to facilitate Helium recovery. The moveable structural components of the aircraft raise concerns regarding structural members rubbing on a fairly thin plastic surface and ultimately causing the envelope to fail. Therefore, reinforcement layers 130 are located in areas likely to experience increased wear and tear from the moveable internal structure of the aircraft. Reinforcement layers 130 are made of Mylar or some other wear resistant, lightweight, and flexible material, to increase the serviceable life of the envelope. In an embodiment, the reinforcement layer is also added to areas likely to experience debris impact, such as the leading edge and under the translation assemblies.

Figure 24:
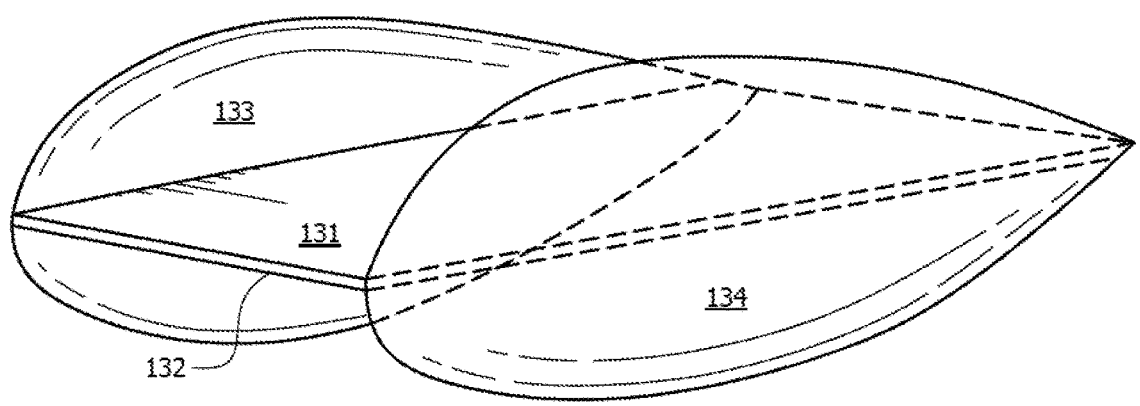
FIG. 24 is a perspective view of an embodiment showing possible configuration of internal panels used to create compartmentalized gas bladders.

FIG. 24 shows internal gas partition panels that create separate gas bladders within the envelope. The partition panels act as flexible walls creating four independent chambers. The partition panels include top panel 131, bottom panel 132, starboard panel 133, and port panel 134. Top panel 131 runs between the outriggers and rests on the central core, both of which are not shown to aid in clearly identifying the internal panels. Bottom panel 132 also runs between the outriggers, but is located under the central core. Both the port and starboard panels 134 and 133 run between the top and bottom longerons on the respective sides of the aircraft. The panels are preferably made from the same material as the envelope, however any lightweight flexible and airtight material known to a person having ordinary skill in the art may be used. These panels aid in the recovery of the low-density gas used in the LTA configuration. The partition bladders also reduce the possibility of catastrophic gas loss if the envelope integrity is violated. Additional dividers or bladders may be included depending on aircraft mission and configuration.

Figure 26:
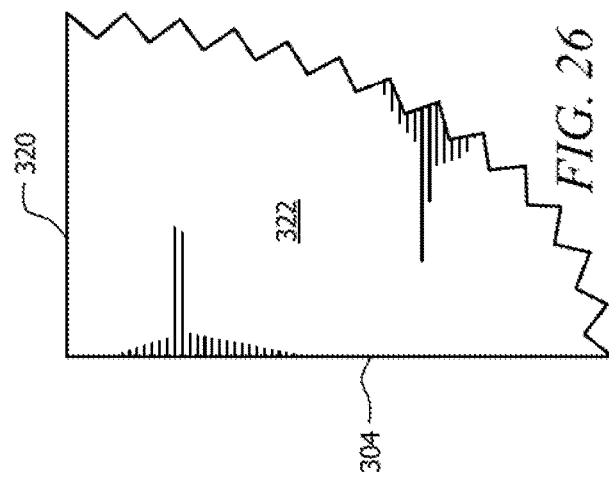
FIG. 26 is a sectional view of the highlighted portion in FIG. 34, illustrating the accordion-like surface.
Figure 25:
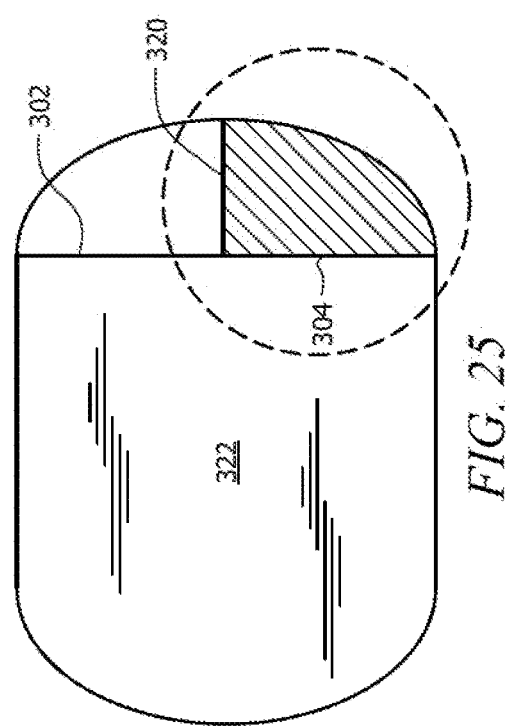
FIG. 25 is a front view of an embodiment highlighting the bottom port side of the flexible envelope.
Figure 27:
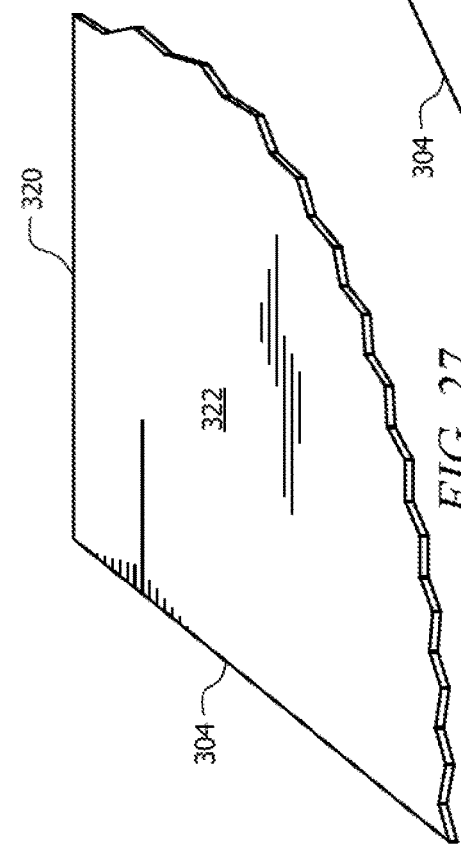
FIG. 27 illustrates how the accordion-like surface of the section of the envelope expands as the aircraft transforms between the LTA configuration and an HTA configuration.
Figure 28:
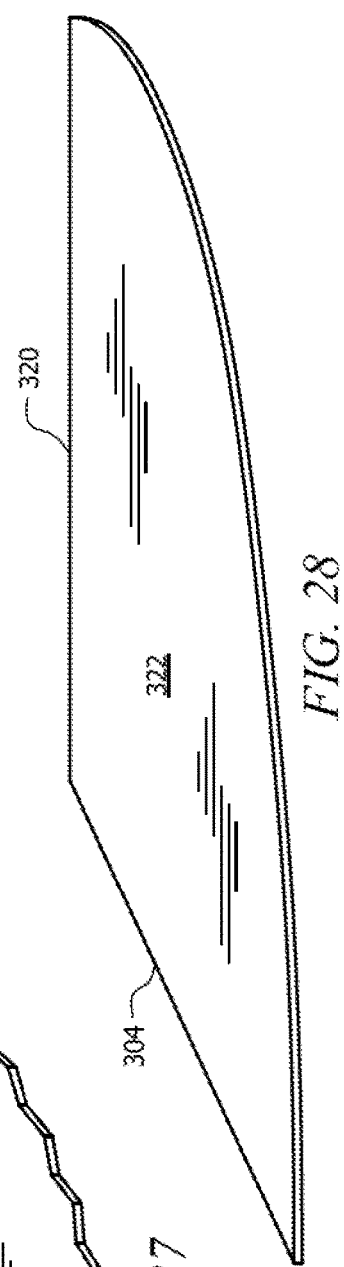
FIG. 28 illustrates how the accordion-like surface of the section of the envelope expands as the aircraft transforms between the LTA configuration and the dash configuration.
Figure 29:
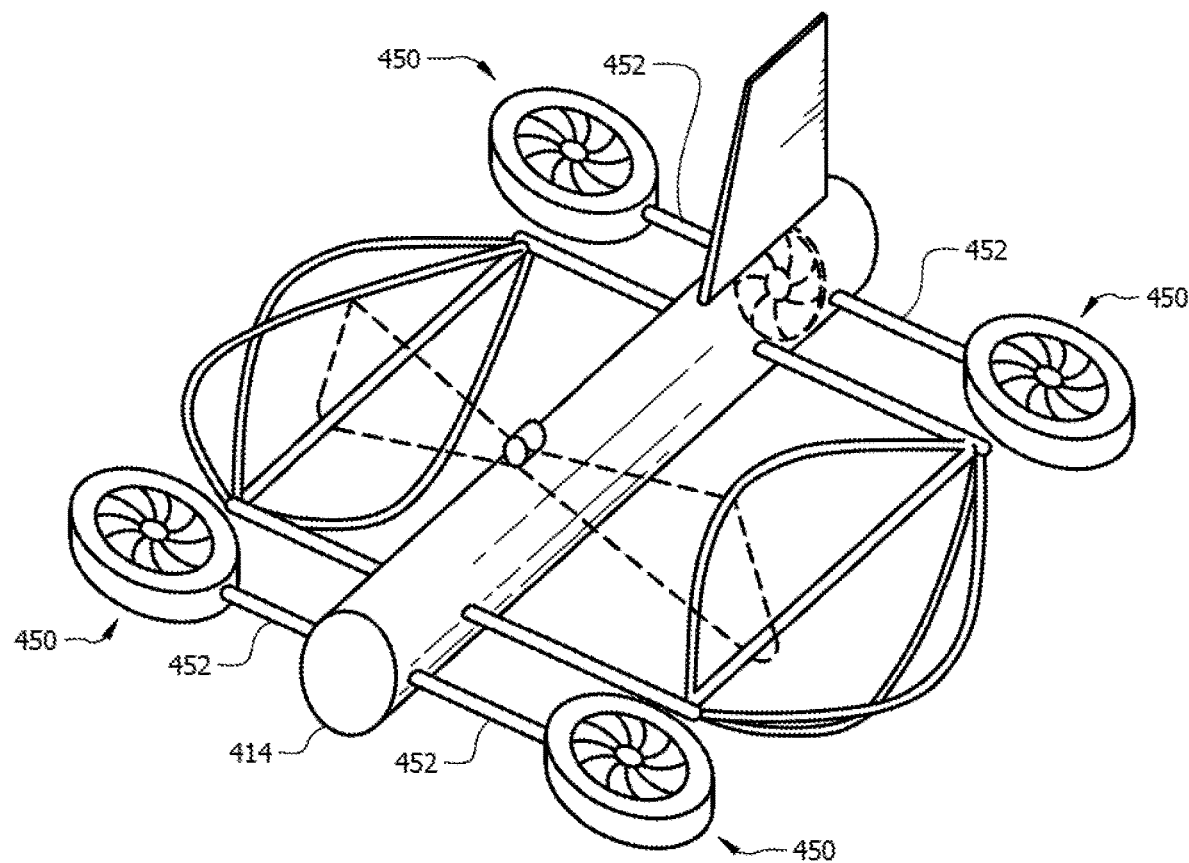
FIG. 29 is a perspective view of an embodiment of the aircraft.
Figure 30:
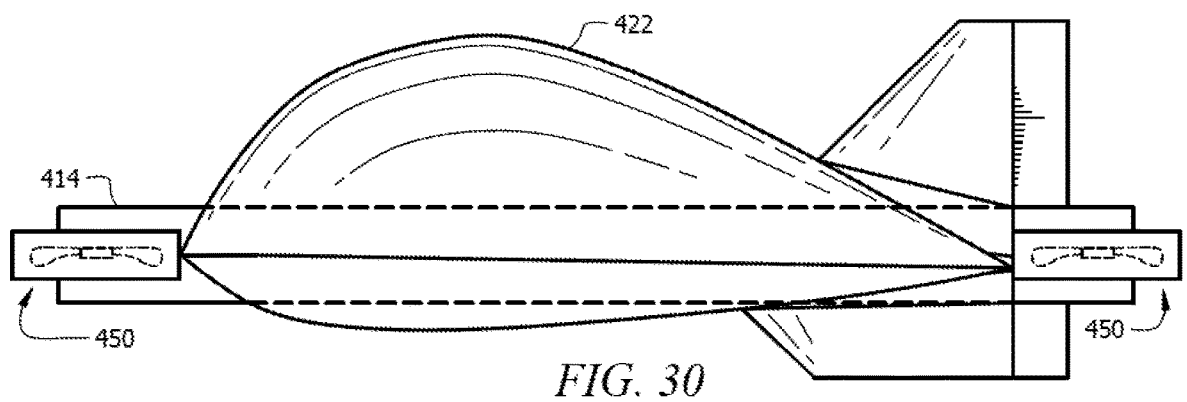
FIG. 30 is a side view of an embodiment of the present invention shown in a positive lift configuration.
Figure 31:
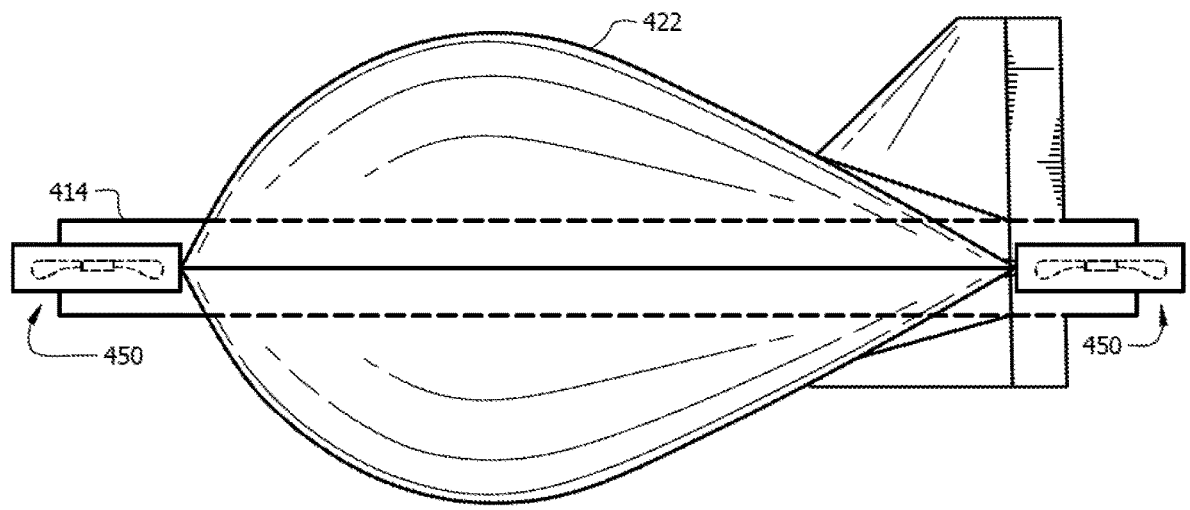
FIG. 31 is a side view of an embodiment of the present invention in an LTA configuration.
Figure 32:
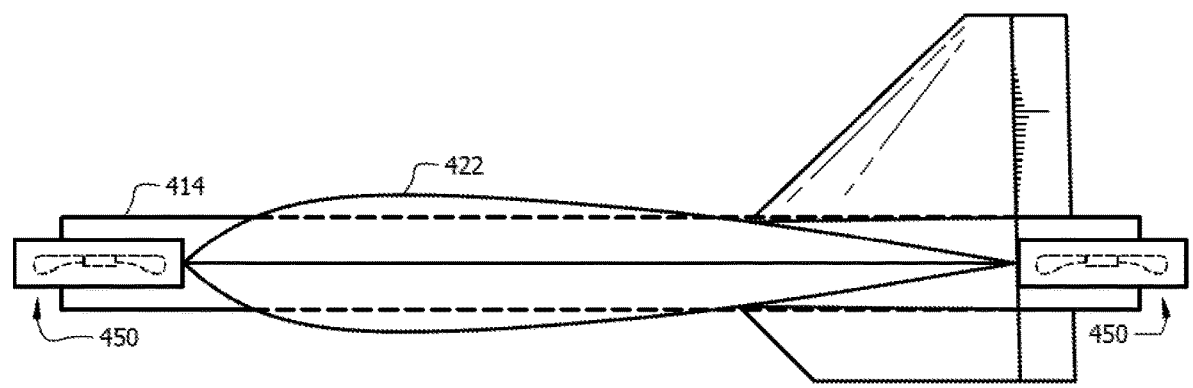
FIG. 32 is a side view of an embodiment of the present invention in the dash configuration.

Alternate embodiments of the aircraft may include an envelope having varying elasticity. For example, smaller aircrafts may have a generally elastic envelope, mid-sized aircraft may have sections in the lobe/wing tip area that have material of different elasticity integrated in patches into the skin, and large aircraft may have an accordion-like or semi rigid surface as shown in FIGS. 25-38. FIGS. 26-28 show the transition of the port side lower lobe transitioning from the LTA configuration to an HTA configuration and illustrate the alteration of the accordion-like portion of envelope 322 from a compressed position to an extended position. Along with easing the ability of the craft to transform between the HTA and LTA configurations, the accordion-like envelope may also act as a flow disturbance to maintain laminar flow over the surface of the aircraft.

The envelope may also include sections on the underside that are more rigid than the rest of the envelope to provide a landing surface for the aircraft. In an embodiment, these sections are strategically arranged as is known to a person having ordinary skill in the art to provide a landing surface for water landings. The landing surface for water landings is designed such that the amount of surface area in contact with the water is small enough to enable the lifting force created by the aircraft, when in the LTA configuration, to overcome the surface tension of the water.

In an embodiment, the envelope may have an opening, preferably reseal-able, that facilitates maintenance, deconstruction, and transportation. In an embodiment, the envelope may include an independent closure mechanism, as is known to a person having ordinary skill in the art, for temporarily sealing the flexible envelope around the internal structures of the aircraft.

Propulsion System

In an embodiment, the present invention includes a central, tubular core containing a propulsion system. The propulsion system is preferably an Electronic Ducted Fan (EDF) motor. An embodiment may include several cores depending on the size of the aircraft and the mission requirements. In addition, these cores can be located anywhere about the body of the aircraft and may include any type of propulsion system known to a person of ordinary skill in the art, such that the location and type of propulsion system does not interfere with the convertibility of the aircraft.

Referring back to Table 2, the motor size and number of motors are derived for each of the three configurations to determine if commercially available EDF motors can be used in the design. The data proves that a single 3000 gmf motor is sufficient to achieve the desired velocity for the 1-meter-by-1-meter sized aircraft. This size motor is readily available for Radio Control (RC) aircraft. For larger size craft, the number of core units would be increased to provide the required thrust. This assessment shows that two core units of roughly the same size as above will propel a 2-meter-by-2-meter design. Larger motors or core combinations of four motors would be required for the 4-meter-by-4-meter design. In an embodiment, any number and type of motors may be used as is known to a person having ordinary skill in the art.

Glider Embodiment

An embodiment of the aircraft may lack a propulsion system, such that the HTA configuration results in a glider. The glider embodiment of the present invention reflects a logical adaptation of this powered design to a non-powered glider design. The glider embodiment would be uniquely capable of independently reaching sufficient altitude (through the LTA configuration), such that traditional shore-based Reception, Staging, Onward Movement, and Integration (RSOI) logistics depots could be overflown and bypassed. Additionally, the glider is capable of ferrying a variety of supply classes directly to the point of need using the wing load management system with an order of magnitude cost reduction over current methods. Moreover, the design organically incorporates an all-weather launch capability that enables scalable parallel sorties for high system throughput.

In an embodiment, the non-powered glider includes core(s) for structural support and/or for gas container(s). The core further provides attachment points for additional equipment and may serve as a lead component in adjusting the aircraft's chord length in a variable chord embodiment discussed further down.

As provided in Table 3 below, the glider embodiment provides an excellent solution in all areas and is clearly superior in the areas of cost/complexity to deploy, mission adaptability, and all-weather performance.

TABLE 3

| PARAMETER | FIXED WING GLIDER | AUTO GYRO | CONTROLLED PARACHUTE/SOFT GLIDER | TRADITIONAL LTA | PRESENT INVENTION |
|---|---|---|---|---|---|
| RECURRING UNIT COST | Moderate | High | Low | Low | Low |
| SUPPORT/DEPLOYMENT COST | High | High | Low | Low | Low |

TABLE 3-continued

| PARAMETER | FIXED WING GLIDER | AUTO GYRO | CONTROLLED PARACHUTE/SOFT GLIDER | TRADITIONAL LTA | PRESENT INVENTION |
|---|---|---|---|---|---|
| COMPLEXITY GROUND SUPPORT EQUIPMENT REQUIRED | Moderate High Impact - Launch system need to get aircraft to initial altitude. Methods (tow/JATO/ground launch) require extensive ground or shipboard. | High High Impact - Launch system need to get aircraft to initial altitude. Methods (tow/air launch) require extensive ground or shipboard. | Low High to Mod - Air drop from cargo aircraft | Low Low - generally tethers and securing posts are sufficient for most LTA aircraft | Low Low - Self deploying system requires only attachment to the cargo pallet, leveling and release. |
| PAYLOAD CAPACITY AS A FUNCTION OF THE 463L PALLET | Moderate - aircraft would need to be very large to carry full 463L pallet | Moderate - aircraft would need to be very large to carry full 463L pallet | Moderate - aircraft would need to be very large to carry full 463L pallet | Moderate - aircraft would need to be very large to carry full 463L pallet | Moderate - aircraft would need to be very large to carry full 463L pallet |
| CONTROLLABILITY TO TARGET LOCATION | Moderate - good to target but one landing only | Moderate - good to target but one landing only | Moderate - good to target but one landing only | Low - without power, very difficult to adjust for environment | High - highly adjustable flight path, even w/environmental condition changes |
| TRANSPORT AND HANDLING CONVENIENCE | Low - even with folding wings or other components, aircraft will require large storage space | Low - even with folding wings or other components, aircraft will require large storage space | High - package similar to traditional parachute | Moderate - may require considerable storage volume | High - shipped in a small, stackable container tube and fully ready to expand and inflate |
| LAUNCH COMPLEXITY | High - Launch to altitude requires significant infrastructure regardless of launch method. | High - Launch to altitude requires significant infrastructure regardless of launch method. | Moderate - process of loading and deployment from drop aircraft well defined but takes cargo aircraft into harm's way. | Moderate - may require considerable storage volume | Low - Self deploying system requires only attachment to the cargo pallet, leveling and release. |
| RETRIEVAL COMPLEXITY | High - Requires extensive clearance area for descent and landing. | High to Mod - Requires moderately large clearance for approach and landing | High to Mod - Requires moderately large clearance for approach and landing | High to Mod - Requires moderately large clearance for approach and landing | Low - Conversion to full or partial LTA allows for vertical descent. |
| LOADING COMPLEXITY/TIME TO LOAD | High | High | Moderate | Low | Low |
| COMPLEXITY/TIME TO UNLOAD | High | High | Low | Moderate | Low |
| THROUGHPUT COST | High | High | Moderate | High | Low |

Hybrid Rotor Embodiment

An embodiment, as shown in FIGS. 29-32, includes a plurality of rotors 450 to combine the functionality of a rotor craft with the shape-shifting abilities of the present invention. The embodiment includes an extended core 414 that projects beyond envelope 422 in both the fore and aft directions to provide a structure on which rotors 450 can be externally mounted. Each rotor 450 is secured to rotor structural member 452, which is in turn secured to core 414. In an embodiment, rotor structural member 452 passes through core 414 to secure a rotor 450 on both the starboard and port sides of the aircraft. An embodiment may also include rotors 450 pivotally secured to rotor structural member 452 to increase the thrust vectoring capabilities of the aircraft.

The rotor structures provide additional flight controlling features to improve the control and maneuverability of the aircraft. For example, the rotor structures enable the aircraft to perform vertical takeoff and landings at a greater speed and control than would be possible without the rotors. These rotors may pivot on multiple axes to provide or augment control (pitch, yaw and/or roll), and thrust (vertical or horizontal).

Stability and Control Components

Referring back to FIGS. 1-5, the aircraft also includes flight stability and control components, such as elevons 124 (which may be substituted by an elevator/aileron configuration and/or thrust vectoring), vertical stabilizer 125, rudder 126, leading edge shield 127, and propulsion system 128. The pair of rear-mounted elevons 124 perform the function of both elevators and ailerons to control pitch and roll. Both are controlled via servos and a microprocessor mounted to the core assembly. Yaw control/directional stability is provided through rudder 126 mounted to vertical stabilizer 125.

Figure 33:
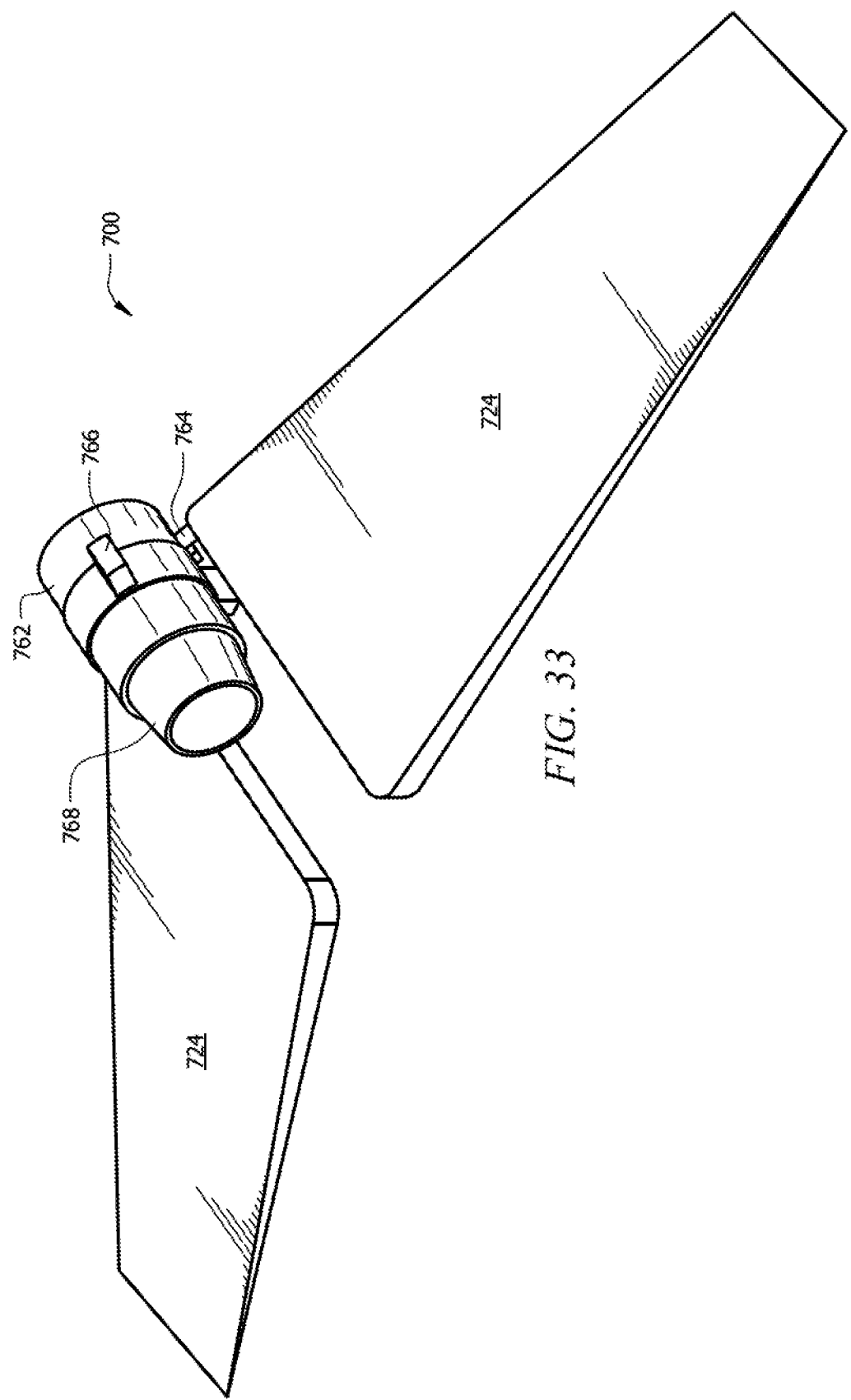
FIG. 33 is a perspective view of an embodiment of a detachable tail section.

Another multiple control surface configuration is depicted in FIG. 33 that reduces aircraft weight and complexity.

An embodiment may include rudder 126 configured to project into the ducted fan airstream to provide a degree of thrust vectoring for very low speed flight and low velocity maneuvering. It is envisioned that the larger sizes of this LTA would employ thrust vectoring entirely as its method of directional control for certain applications as depicted in FIG. 33. Thrust vectoring with multiple motors and larger sizes would significantly reduce the weight of the aircraft and provide superior maneuvering capability over conventional control surfaces.

An embodiment may include supplementary thrust vectoring to aid in flight control of the aircraft, particularly during low speed LTA operations. The aircraft may include supplemental thrust vectoring located generally at each corner of the base structure. The thrust could originate from a manifold running from the central core to vectoring nozzles or could originate from a separate motor(s) dedicated to the supplementary thrust vectoring. Another source of thrust could originate from venting internal pressure using a set of valved nozzles. The source of the vented pressure is preferably another gas container that is separate from the lighter-than-air gas tank. The additional gas container may store and release atmospheric gas.

In an embodiment, the aircraft may include a center of mass (CM) management system. The CM management system can modify the angle of attack and roll by shifting mass in the aircraft, similar to a pilot shifting weight to control a hang-glider.

Detachable Tail

An embodiment of the aircraft may include a detachable tail section. The detachable tail section mates to the base structure of the aircraft without impacting the airtight seal and may include control surfaces.

Referring now to FIGS. 33-36, detachable tail 700 includes control surfaces 724 (that may be configured as elevons, ruddervators, aelerons, elevators and/or rudders, depending on flight mode) pivotally connected to tail core 762 through rotational element 764. Motors 766 control the rotation of the control surfaces 724 about the longitudinal axis of the control surfaces as depicted by directional arrows 770 shown in FIG. 36A. In an embodiment, non-rotating (stabilizing fins) or additional rotating control surfaces might be added for various mission profiles. In addition to the control surfaces 724, detachable tail 700 also employs thrust vectoring cone 768 to further control the flight of the aircraft.

Figure 34:
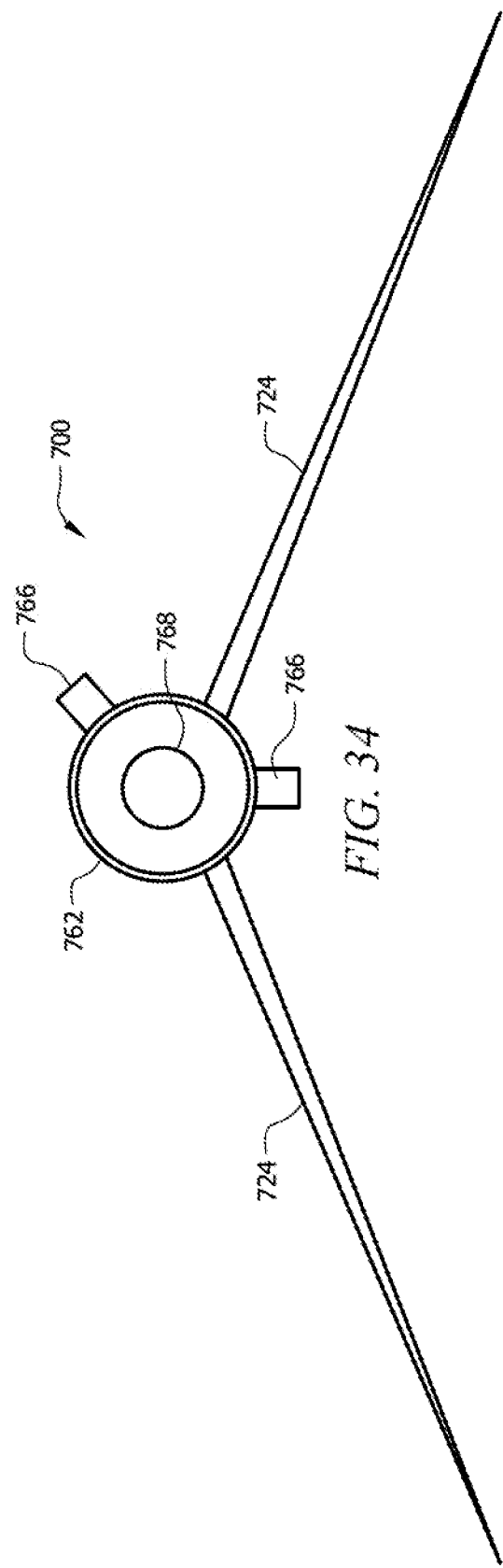
FIG. 34 is a rear view of the embodiment in FIG. 33.
Figure 35:
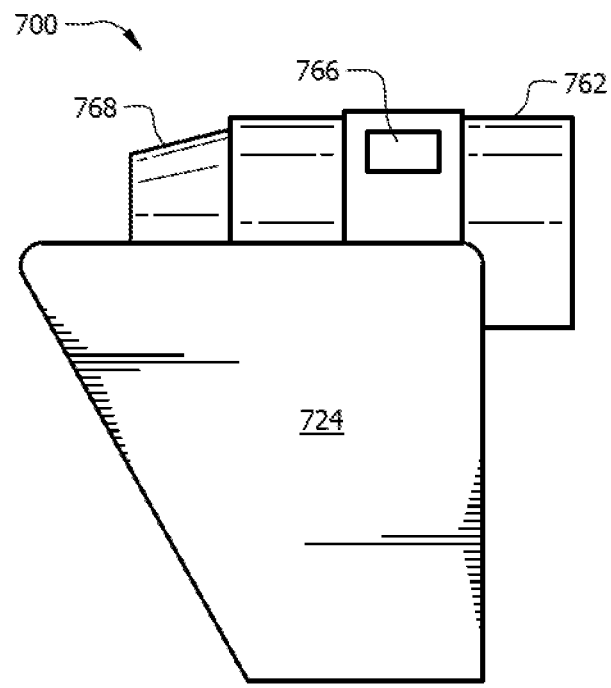
FIG. 35 is a side view of the embodiment in FIG. 33.
Figure 36A:
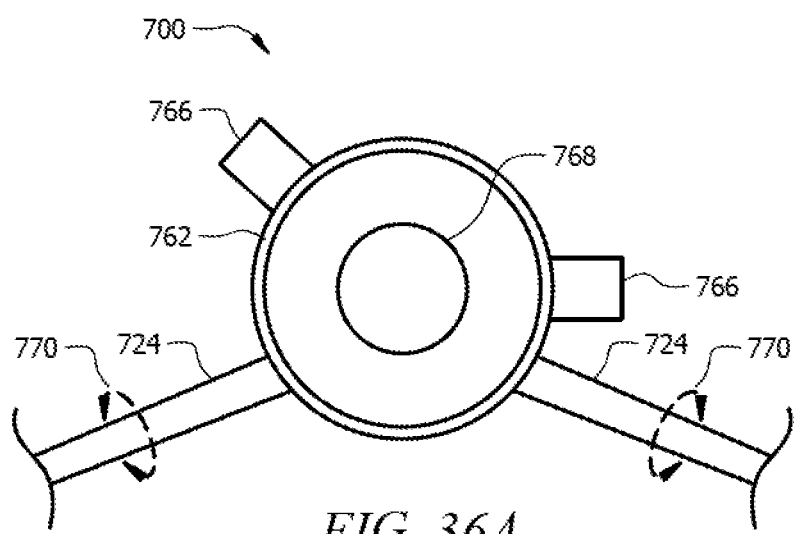
FIG. 36A is a rear view of the embodiment shown in FIG. 33, highlighting the rotation of the control surfaces.
Figure 36B:
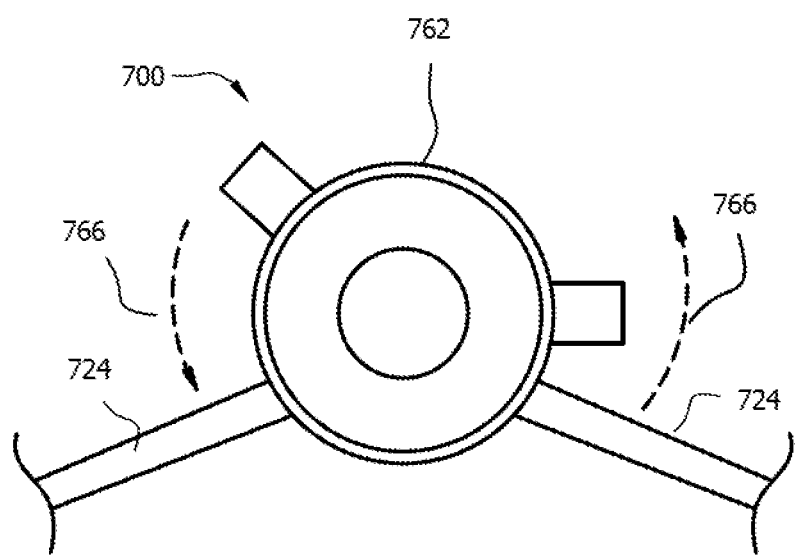
FIG. 36B is a rear view of the embodiment shown in FIG. 33, highlighting the rotation of the control surfaces.

In an embodiment, as shown in FIG. 36B, control surfaces 724 may be rotationally secured to tail core 762. As a result, control surfaces 724 may be rotationally reoriented as depicted by arrows 766. Exemplary arrows 766 illustrate a counter-clockwise rotation, but control surfaces 724 are adapted to rotate both in a clockwise and counter-clockwise direction. This rotation allows each control surface 724 to act in multiple roles without additional structural members. For example, the control surfaces can achieve 3 entirely distinct orientations: 1) the control surfaces can be oriented in a vertically aligned position (one upward and one downward) to act as moving or non-moving vertical stabilizers when the aircraft is configured in a low speed LTA configuration; 2) the control surfaces can be oriented approximately as shown in FIG. 34 to operate as aileron/elevator/elevons for moderate speed flight in a high lift camber position; and 3) the control surfaces can be oriented approximately horizontally to provide minimum coefficient of drag flight control during high speed flight. In addition, non-rotating (stabilizing fins) or additional rotating control surfaces might be added for various mission profiles.

In an embodiment a detachable tail 700 is intended to removably fasten to core 114 by sliding core 762 into core 114. As a result, the outer diameter of tail core 762 is slightly smaller than the inner diameter of core 114. This arrangement allows envelope 122 to seal around core 114 while tail 700 slides into core 114 without interfering with the seal between envelope 122 and core 114. This same concept applies to the attachment of forward and/or aft rotors as described in the Hybrid Rotor Embodiment.

FIGS. 33-36 depict the control surfaces extending downward in a generally V-shape orientation. In an embodiment, the control surface may be oriented to extend upward and/or the tail may include one or more additional control surfaces extending outwardly from the tail core and may be either fixed (as stabilizing fins) or articulating (as control or trim surfaces).

Variable Chord Length Embodiment

Figure 40A:
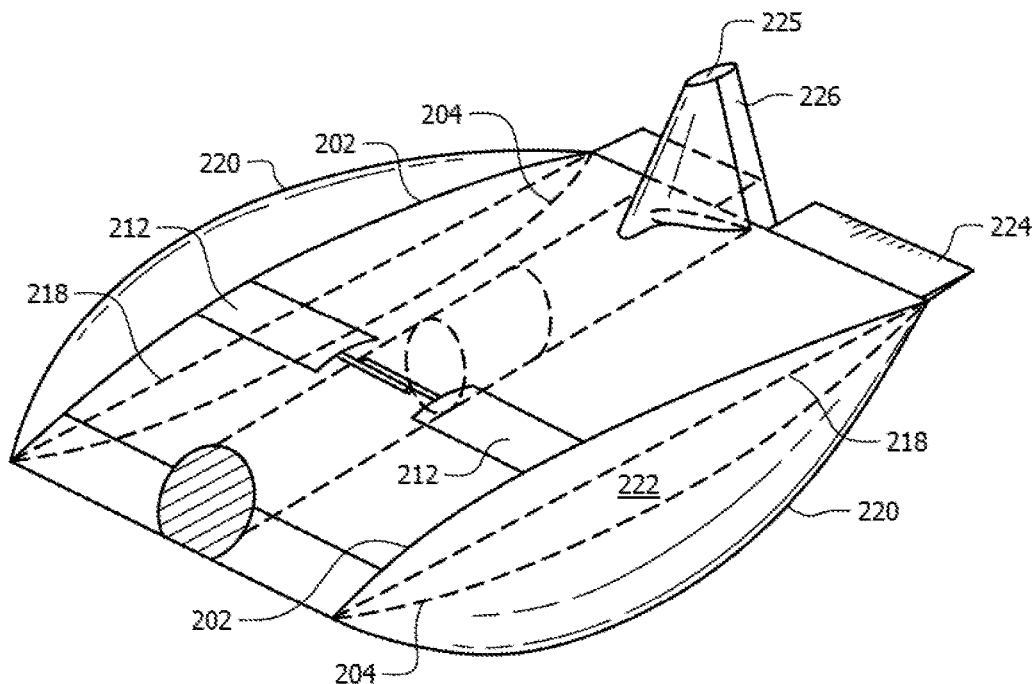
FIG. 40A is a perspective view of an embodiment of the present invention having a variable chord length.
Figure 40B:
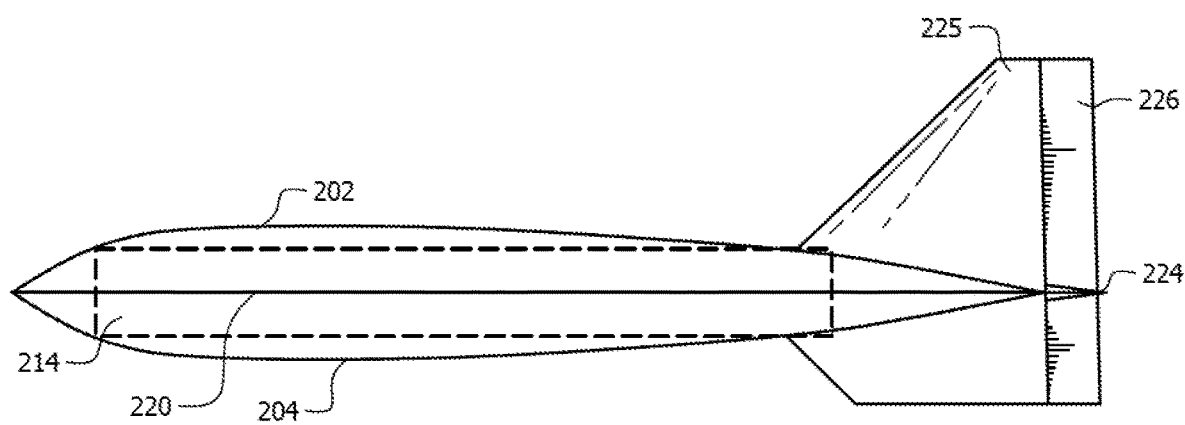
FIG. 40B is a side view of FIG. 40A.
Figure 41:
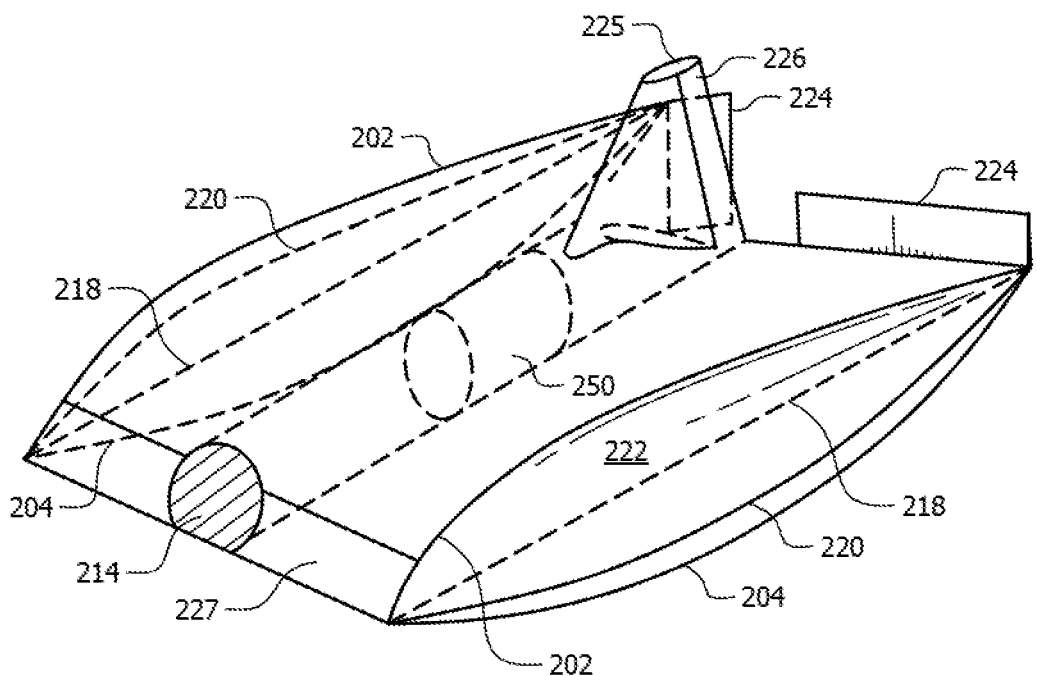
FIG. 41 is a perspective view of an embodiment of the present invention having a variable chord length at the outriggers.
Figure 42:
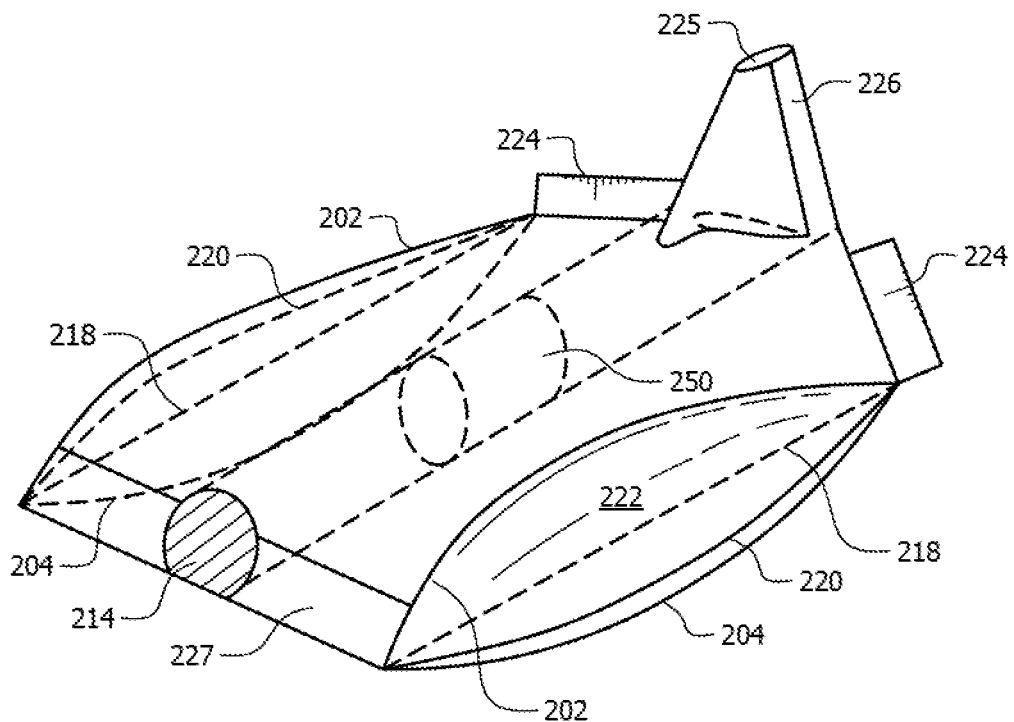
FIG. 42 is a perspective view of an embodiment of the present invention having a variable chord length.

In an embodiment, as shown in FIGS. 40-42, at least some portion of the aircraft has a variable chord length—the distance between the trailing and leading edges. An adjustable chord length provides the aircraft with another method of altering the aspect ratio and in turn the performance of the aircraft. Additionally, the adjustment of the chord length provides the aircraft with another method of or an additional aid in transforming between the LTA and HTA configurations.

As shown in FIG. 40, the dash configuration can be achieved by lengthening the chord of the aircraft. The length of the chord can be reduced to create the symmetric LTA configuration shown in FIG. 4. Additionally, this embodiment may include the upper and lower translation assemblies to further manipulate the lifting characteristics and to allow for nearly an infinite array of aircraft shapes.

The variable chord feature may be achieved in any manner known to a person having ordinary skill in the art. In an embodiment, the entire trailing edge strut is adapted to move when adjusting the aircraft's chord length. The adjustment may be accomplished through a drive mechanism such as collet 250, which mechanically lengthens core 214 on which the trailing edge strut is secured. Outriggers 218, longerons 202 and 204, and slack managers 220 may also include similar collets (not shown) to allow these members to adjust in length. In an embodiment, the longerons 202 and 204, outriggers 218, and slack managers 220 are structurally designed to telescope and are each subjected to an inherent biasing force trying to extend their respective chord lengths. When the core's chord length extends, taking trailing edge strut 216 with it, longerons 202 and 204, outriggers 218, and slack managers 220 each extend in length due to their respective inherent biases. Shortening the chord length would be achieved by shortening the core's chord using a drive mechanism with enough force to overcome the biasing forces on longerons 202 and 204, outriggers 218, and slack managers 220.

The length adjusting capabilities of the core, longerons, outriggers, and slack managers may be accomplished by any method(s) or mechanism(s) known to a person having ordinary skill in the art. Additionally, the core and/or the length adjusting mechanism of the core may be in communication with the longerons, outriggers, and slack managers to help adjust their lengths or each may be controlled to move independently from the others.

In another embodiment, the trailing edge of the flexible envelope may be adapted to allow the outriggers and/or longerons to extend outside of the envelope. The core may be directly responsible for adjusting the location of the trailing edge strut, while the outriggers have a non-adjustable chord length. This embodiment would result in some portion of both the outriggers and the longerons extending out from the trailing edge of the flexible envelope in the aft direction when the chord length of the flexible envelope is shortened. This embodiment provides a less complex version to reduce the number of moving parts and the potential problems inherently associated with moving parts.

Referring now to FIGS. 41-42, an embodiment may include a trailing edge strut comprised of two structural members allowing the port and starboard elevons to be angularly oriented with respect to one another. Such an embodiment allows for further manipulation of the aircraft's stability and flight performance. As shown in FIG. 41, core 214 may be non-adjustable or simply remain retracted in chord length while outriggers 218, longerons 202 and 204, and slack managers 220 increase in chord length. As a result, each elevon 224 forms an acute angle with its nearest outrigger 218. Contrastingly, FIG. 38 provides an example of core 214 in an extend chord length position, with outriggers 218 and longerons 202 and 204 in a non-adjustable or a retracted chord length position. As a result, each elevon 224 forms an obtuse angle with its nearest outrigger 218. Each of the configurations above offers a unique stability and performance profile.

Variable Span Embodiment

Figure 43:
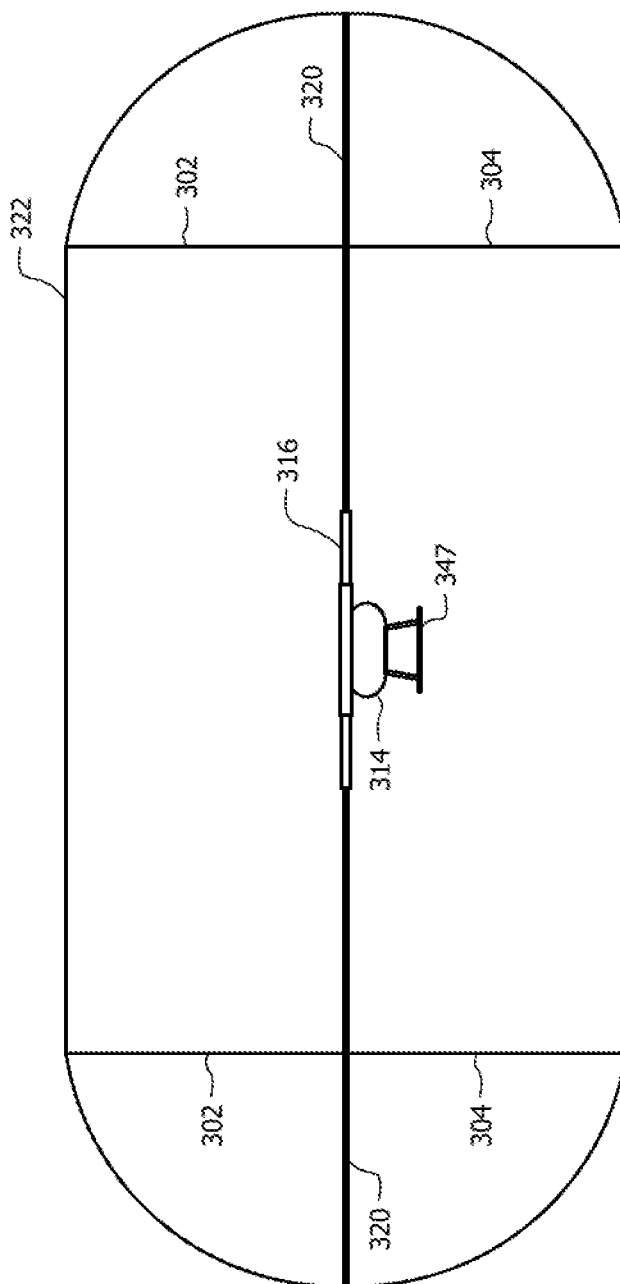
FIG. 43 is front view of an embodiment in the LTA configuration. The translation assemblies are removed from the figure for clarity.

In an embodiment, as shown in FIG. 43, leading edge strut 316 and the trailing edge strut (not visible) each have an adjustable length such that the span of the aircraft can be altered. The struts preferably include a telescoping design, but may include any length adjusting design known to a person having ordinary skill in the art. Moreover, the length may be manually or automatically adjustable. The struts may include intervals at which the struts are capable of locking at predetermined lengths. Such an embodiment may also include rigid support spars having similar length adjusting abilities or may employ flexible strap spars as is shown in FIG. 10. In an embodiment, each strut may be adjusted independently, such that the span of one strut may be varied with respect to the span of the other strut to further increase the variability of the aircraft's aerodynamic characteristics.

Flexible Collapsible Embodiment

Referring now to FIGS. 44-46, an embodiment is designed to enable the aircraft to reduce in size and fit into a tubular container. The embodiment includes several features enabling the reduction in size, including adjustable length struts, semi-rigid longerons, and flexible translation assemblies. Adjustable length leading edge strut 316 and trailing edge strut (not shown) enable the span of the aircraft to shorten. Semi-rigid longerons 302, 304 flex to encircle core 314 and struts 316 (when reduced in length). The longerons are resilient enough to return to operational positions when released. Each flexible translation assembly includes translation strap(s) 312 and motor 308 (shown in FIGS. 18 and 19).

The flexible translation assemblies enable the aircraft to be rolled up for easier transportation. As shown in FIGS. 44-46, the leading and trailing edge struts 316 telescope down into a reduced length, which significantly reduces the span of the aircraft. Then, slack managers 320 are forced towards the central longitudinal axis of the aircraft as shown in FIG. 45. Finally, longerons 302 and 304 are rotated around core 314 as shown in FIGS. 45-46. The aircraft is then stored in a tubular container or restrained with cargo straps to greatly improve the ease with which the aircraft can be transported.

Figure 47:
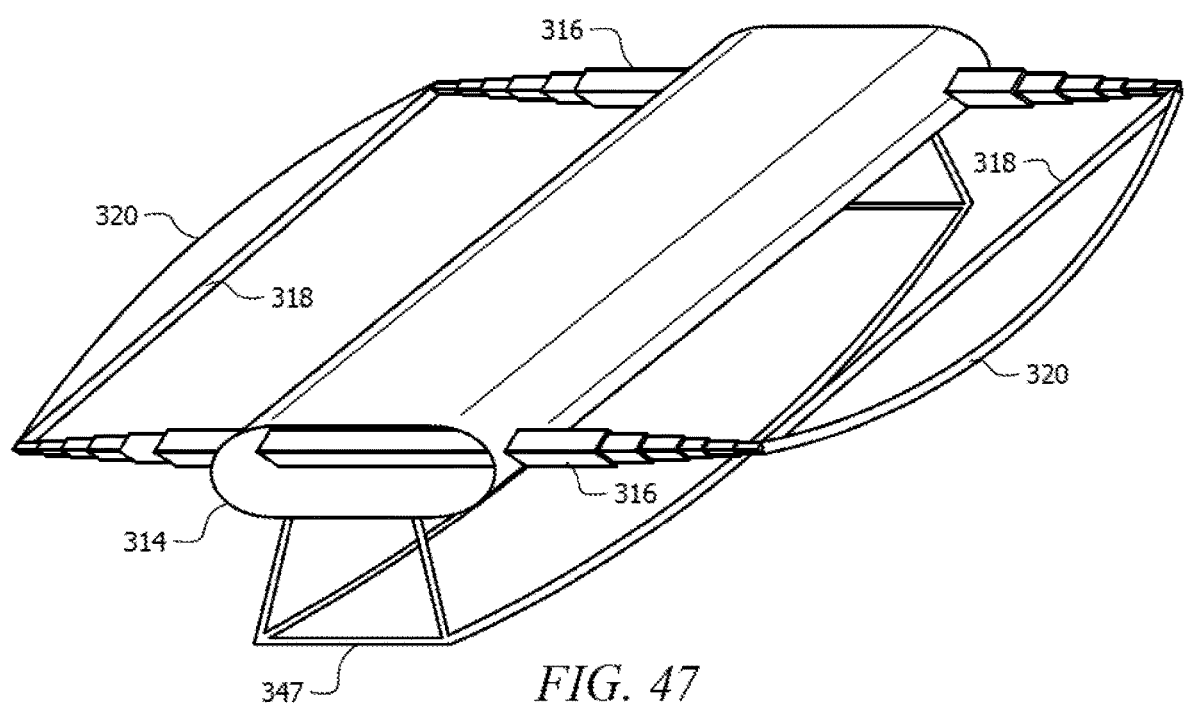
FIG. 47 is a perspective view of an embodiment of the aircraft highlighting the telescoping leading and trailing edge struts attached to an oval-shaped core having an external payload hard point. The longerons, envelope, and translation assembly are removed from the figure for clarity.

As highlighted in FIG. 47, the embodiment employing a strap based translation assembly includes payload hard point 347 attached to core 314. FIG. 47 does not include the longerons or the envelope to improve clarity. There may be any number of payload hard points 347 extending in any direction. As shown in FIG. 19, envelope 322 may attach to the edge of payload hard point 347 to provide an externally located payload hard point 347.

Figure 48:
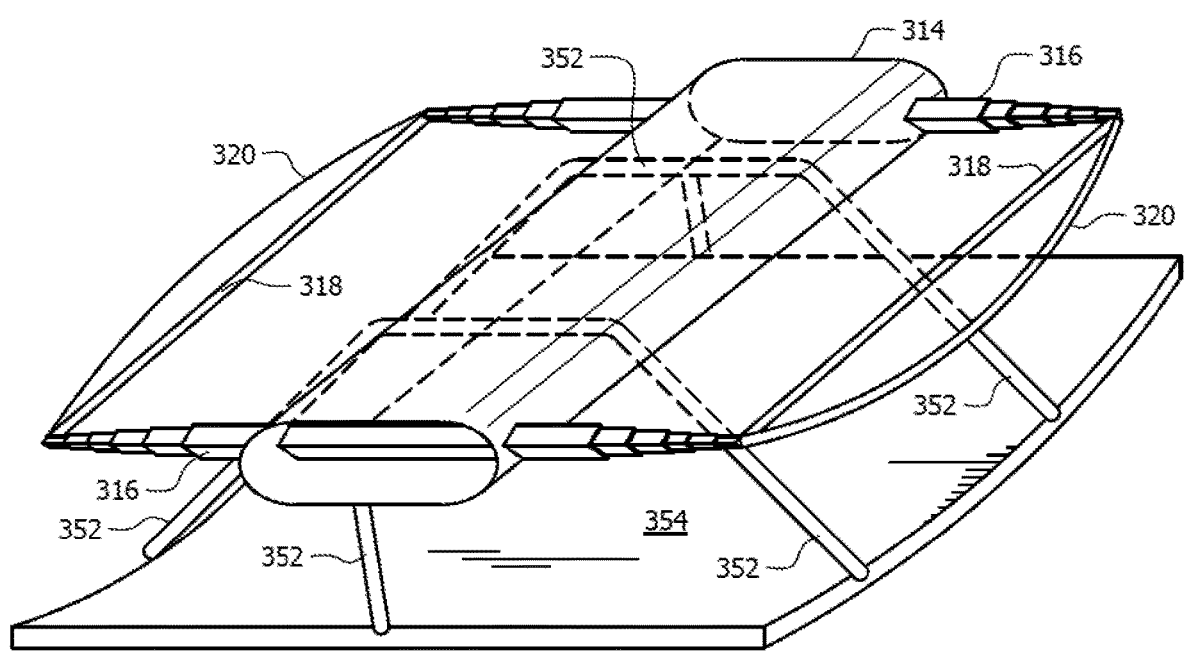
FIG. 48 is a perspective view of an embodiment having a cargo pallet attached to the aircraft.

As shown in FIG. 48, the aircraft may include cargo straps 352 adapted to attach to external cargo pallet 354. Cargo straps 352 are in communication with the structure of the aircraft and pass through the envelope. Cargo pallet 354 is preferably made of lightweight materials in a structurally sound configuration. For example, cargo pallet 354 may include a balsa or honeycomb core covered with a carbon fiber sheet. Additionally, cargo pallet 354 preferably has an aerodynamic profile.

Cargo straps 352 may be adjustable in length or include a mechanism for reeling the straps towards core 314. Thus, the entire assembly can tuck into the underside of the aircraft and has an aerodynamic profile similar to that of the flying wing configuration. Such an embodiment will likely include an envelope having sections with varying elasticity. For example, the portion of the envelope spanning the length of the extended leading and trailing edge struts 316 may be generally inelastic such that the location of the passage of cargo straps 352 through the envelope remains consistent throughout the conversions between LTA and HTA configurations. The other portions of the envelope may have greater or lesser elasticity to enable easier transitions between configurations as is known to a person having ordinary skill in the art. Furthermore, the envelope may have a differing elastic modulus along different axes. For example, the envelope may have greater elasticity along the span than along the chord length.

Outrigger Versatility

In an embodiment, the outriggers may be thrust tubes to provide differential thrust as flight a control method. In another embodiment, the outriggers may be gas tubes for storing additional lighter-than-air gas. The outrigger tubes may also carry liquid gas to supplement the lighter-than-air gasses inside the envelope and facilitate multiple re-inflation cycles with or without recovering gas from the envelope or used for other purposes.

Energy Generation/Recovery

An embodiment of the aircraft may be equipped with flexible solar panels mounted to the upper exterior surface of the envelope to extended on station performance. This allows the aircraft to remain in the LTA configuration and hover while the system batteries are recharged. Energy recovery through the EDF, when equipped, is also available while in buoyant mode if turned into an oncoming airstream.

Fuel cells may be used to generate electricity for battery system charging directly powering aircraft electrical systems or other purposes. Additionally, waste Hydrogen from the fuel cell process may be used to augment the buoyant gas within the envelope.

Communication

An embodiment may include communication or antenna components. The antenna array provides additional operational capabilities, such as surveillance, communication, or radar interference. In an embodiment, the structure and envelope may be shaped or made of a material less likely to impede the transmission of electromagnetic waves. Antenna elements may also be embedded in the envelope surface.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

Cargo and Payload Attachment Various cargo and payload management techniques have been discussed in various embodiments aforementioned. The highly versatile design allows for the stowage of cargo, attachment of payloads and sensors, and mounting of sensors in internal and/or external locations. FIGS. 18, 19, and 48 depict an external hardpoint that reduces gas volume, but allows for easy payload attachment. Additionally, the design accommodates externally accessible core tubes if external access is required and other external hard points as depicted in FIGS. 14-17. Furthermore, the innovative design allows for mounting of payloads, not requiring frequent external access, to be mounted directly to the core or other internal structure and/or the aircraft skin. Such an embodiment, however, has provisions for one or more re-sealable penetrations that allow access for payload management and/or maintenance.

It is also to be understood that the following claims are intended to cover all of the generic and specific features of the invention herein described, and all statements of the scope of the invention that, as a matter of language, might be said to fall therebetween.

What is claimed is:

1. An aircraft comprising:
a convertible design having a lighter-than-air configuration and a heavier-than-air configuration;
a flexible envelope in communication with a base structure, wherein the flexible envelope has a leading edge and a trailing edge creating a chord line;
a span extending from a port side wingtip to a starboard side wingtip;
the lighter-than-air configuration including the aircraft having a span that is less than the span of the aircraft when in the heavier-than-air configuration; and
both the lighter-than-air configuration and heavier-than-air configuration including the aircraft having a span that is greater than or equal to a length of the chord line.

2. The aircraft of claim 1, wherein the base structure includes a hollow core tube, a port side outrigger, and a starboard side outrigger, the hollow core tube has an adjustable chord length directionally parallel with a longitudinal axis of the aircraft, such that the hollow core tube is capable of adjusting at least some portion of the chord length of the aircraft.

3. The aircraft of claim 2, wherein the port side outrigger and the starboard side outrigger each have an adjustable chord length, such that at least some portion of the chord length of the aircraft adjusts as each outrigger's chord length adjusts.

4. The aircraft of claim 1, further comprising:
an upper adjustable longeron, wherein the upper adjustable longeron is in communication with the base structure, the flexible envelope, and a translation assembly;
the translation assembly having an extended configuration where the upper adjustable longeron is in a high camber orientation and a retracted configuration where the upper adjustable longeron is in a low camber orientation, in transitioning to the retracted configuration, the translation assembly moves the upper adjustable longeron inwards towards a central longitudinal axis of the aircraft to decrease aircraft thickness, and in transitioning to the extended configuration, the upper adjustable longeron moves outwards away from the central longitudinal axis of the aircraft to increase the aircraft thickness;
a length-adjusting slack manager in communication with the flexible envelope and subject to a bias force attempting to force the slack manager outwards in a direction away from the central longitudinal axis of the aircraft; and
the length-adjusting slack manager having a retracted position and an extended position, wherein the length-adjusting slack manager is capable of transitioning between the retracted and expanded positions to alter the shape of the flexible envelope.

5. The aircraft of claim 4, wherein the upper adjustable longeron is a pair of upper adjustable longerons.

6. The aircraft of claim 1, further comprising:
a lower adjustable longeron, and the lower adjustable longeron is in communication with the base structure, the flexible envelope, and a translation assembly;
the translation assembly having an extended configuration where the lower adjustable longeron is in a high camber orientation and a retracted configuration where the lower adjustable longeron is in a low camber orientation, in transitioning to the retracted configuration, the translation assembly moves the lower adjustable longeron inwards towards a central longitudinal axis of the aircraft to decrease aircraft thickness, and in transitioning to the extended configuration, the lower adjustable longeron moves outwards away from the central longitudinal axis of the aircraft to increase the aircraft thickness;
a length-adjusting slack manager in communication with the flexible envelope and subject to a bias force attempting to force the slack manager outwards in a direction away from the central longitudinal axis of the aircraft; and
the length-adjusting slack manager having a retracted position and an extended position, wherein the length-adjusting slack manager is capable of transitioning between the retracted and expanded positions to alter the shape of the flexible envelope.

7. The aircraft of claim 6, wherein the lower adjustable longeron is a pair of upper adjustable longerons.

8. The aircraft of claim 1, further including a port side slack manager and a starboard side slack manager, wherein each slack manager has a generally arc shape and an adjustable chord length in generally the same direction as a central longitudinal axis of the aircraft.

9. The aircraft of claim 1, further including a leading edge strut that is misaligned with a lateral plane of the aircraft.

10. The aircraft of claim 1, further comprising a gas storage and retrieval system adapted to house, distribute, and retrieve lighter-than-air gas.

11. The aircraft of claim 1, further comprising a propulsion system.

12. An aircraft comprising:
a convertible design having a lighter-than-air configuration and a heavier-than-air configuration;
a flexible envelope enclosing a base structure, wherein the flexible envelope has a leading edge and a trailing edge creating a chord line;
one or more translation assemblies in operable communication with and configured to move an upper longeron, a lower longeron, or both the upper and lower longerons, whereby movement of the upper longeron, the lower longeron, or both longerons alters a cross-sectional shape of the aircraft;

a span extending from a port side wingtip to a starboard side wingtip;

the lighter-than-air configuration including the aircraft having a span that is less than the span of the aircraft when in the heavier-than-air configuration; and both the lighter-than-air configuration and heavier-than-air configuration including the aircraft having a span that is greater than or equal to a length of the chord line.

13. The aircraft of claim 12, wherein the base structure includes a hollow core tube, a port side outrigger, and a starboard side outrigger, the hollow core tube has an adjustable chord length directionally parallel with a longitudinal axis of the aircraft, such that the hollow core tube is capable of adjusting at least some portion of the chord length of the aircraft.

14. The aircraft of claim 13, wherein the port side outrigger and the starboard side outrigger each have an adjustable chord length, such that at least some portion of the chord length of the aircraft adjusts as each outrigger's chord length adjusts.

15. The aircraft of claim 12, wherein the base structure includes a leading edge strut extending in a direction perpendicular to and in communication with a hollow core tube, a trailing edge strut extending in a direction perpendicular to and in communication with the hollow core tube, a port side outrigger extending in a direction parallel to the hollow core tube and in communication with the leading and trailing edge struts, and a starboard side outrigger extending in a direction parallel to the hollow core tube and in communication with the leading and trailing edge struts.

16. The aircraft of claim 12, further comprising:

the translation assembly having an extended configuration where the upper adjustable longeron is in a high camber orientation and a retracted configuration where the upper adjustable longeron is in a low camber orientation, in transitioning to the retracted configuration, the translation assembly moves the upper adjustable longeron inwards towards a central longitudinal axis of the aircraft to decrease aircraft thickness, and in transitioning to the extended configuration, the upper adjustable longeron moves outwards away from the central longitudinal axis of the aircraft to increase the aircraft thickness;

a length-adjusting slack manager in communication with the flexible envelope and subject to a bias force attempting to force the slack manager outwards in a direction away from the central longitudinal axis of the aircraft; and the length-adjusting slack manager having a retracted position and an extended position, wherein the length-adjusting slack manager is capable of transitioning between the retracted and expanded positions to alter the shape of the flexible envelope.

17. The aircraft of claim 16, wherein the upper adjustable longeron is a pair of upper adjustable longerons.

18. The aircraft of claim 12, further comprising:

the translation assembly having an extended configuration where the lower adjustable longeron is in a high camber orientation and a retracted configuration where the lower adjustable longeron is in a low camber orientation, in transitioning to the retracted configuration, the translation assembly moves the lower adjustable longeron inwards towards a central longitudinal axis of the aircraft to decrease aircraft thickness, and in transitioning to the extended configuration, the lower adjustable longeron moves outwards away from the central longitudinal axis of the aircraft to increase the aircraft thickness;

a length-adjusting slack manager in communication with the flexible envelope and subject to a bias force attempting to force the slack manager outwards in a direction away from the central longitudinal axis of the aircraft; and the length-adjusting slack manager having a retracted position and an extended position, wherein the length-adjusting slack manager is capable of transitioning between the retracted and expanded positions to alter the shape of the flexible envelope.

19. The aircraft of claim 18, wherein the lower adjustable longeron is a pair of upper adjustable longerons.

20. An aircraft comprising:

a convertible design having a lighter-than-air configuration and a heavier-than-air configuration;

a flexible envelope in communication with a base structure, wherein the flexible envelope has a leading edge and a trailing edge creating a chord line;

a span extending from a port side wingtip to a starboard side wingtip;

the lighter-than-air configuration including the aircraft having a span that is less than the span of the aircraft when in the heavier-than-air configuration; and the base structure configured to adjust in length thereby altering a straight-line distance between a front end and a rear end of the aircraft.

\* \* \* \* \*